US012767734B2

(12) United States Patent
Cheng et al.

(10) Patent No.: US 12,767,734 B2
(45) Date of Patent: Oct. 20, 2026

(54) APPARATUS AND PROCESS FOR PREPARING POLYALPHA-OLEFINS

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Xin Cheng, Beijing (CN); Shuo Su, Beijing (CN); Bing Xu, Beijing (CN); Zuoxin Huang, Beijing (CN); Xiaojin Tang, Beijing (CN); Tao Huang, Beijing (CN); Ying Han, Beijing (CN); Qinghua Duan, Beijing (CN); Jiayao Yao, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 959 days.

(21) Appl. No.: 17/996,762

(22) PCT Filed: Apr. 20, 2021

(86) PCT No.: PCT/CN2021/088330
§ 371 (c)(1),
(2) Date: Oct. 20, 2022

(87) PCT Pub. No.: WO2021/213367
PCT Pub. Date: Oct. 28, 2021

(65) Prior Publication Data

US 2023/0167204 A1 Jun. 1, 2023

(30) Foreign Application Priority Data

Apr. 20, 2020 (CN) ......................... 202010309683.4

(51) Int. Cl.
*C08F 2/01* (2006.01)
*B01J 19/00* (2006.01)
(Continued)

(52) U.S. Cl.
CPC ............. *C08F 2/01* (2013.01); *B01J 19/0053* (2013.01); *B01J 19/0093* (2013.01); *C08F 4/14* (2013.01); *C08F 10/14* (2013.01)

(58) Field of Classification Search
CPC ..... B01J 4/00; B01J 4/001; B01J 19/00; B01J 19/0053; B01J 19/0093; B01J 19/24;
(Continued)

(56) References Cited

U.S. PATENT DOCUMENTS 3,149,178 A 9/1964 Hamilton et al.
4,045,508 A 8/1977 Cupples et al.
(Continued)

FOREIGN PATENT DOCUMENTS

CN 104370675 B 12/2015
CN 106215828 A 12/2016
(Continued)

OTHER PUBLICATIONS

IP.com Search History (Year: 2025).*
(Continued)

*Primary Examiner* — Natasha E Young
(74) *Attorney, Agent, or Firm* — NKL Law; Allen Xue

(57) ABSTRACT

An apparatus for preparing polyalpha-olefins has an input unit (1), a microchannel reactor (2), and a post-treatment unit (3) that are successively connected. The input unit has a mixer and/or pipeline(s) for delivering an olefin raw
(Continued)

material, an auxiliary feed and a $BF_3$ catalyst to the microchannel reactor (2). The apparatus and process that utilizes the apparatus allow flexible and rapid mixing of the catalyst, the auxiliary feed and the olefin raw material, and have the advantages of high polymerization reaction speed, good mass and heat transfer effects, high reaction conversion, good product selectivity and excellent performance, thereby being suitable for large-scale industrial production.

18 Claims, 6 Drawing Sheets

(51) Int. Cl.
*C08F 4/14* (2006.01)
*C08F 10/14* (2006.01)

(58) Field of Classification Search
CPC ......................... B01J 19/2415; B01J 19/2425; B01J 2204/00; B01J 2204/002; B01J 2219/00; B01J 2219/00049; B01J 2219/00051; B01J 2219/00074; B01J 2219/00076; B01J 2219/0081; B01J 2219/00087; B01J 2219/00092; B01J 2219/00159; B01J 2219/00164; B01J 2219/00781; B01J 2219/00873; B01J 2219/00889; B01J 2219/00891; B01J 2219/00894; B01J 2219/24; B01J 2219/2401; C07C 4/00; C07C 4/02; C07C 4/06; C01B 35/00; C01B 35/06; C01B 35/061
See application file for complete search history.

(56) References Cited

U.S. PATENT DOCUMENTS

| | | | | |
|---|---|---|---|---|
| 4,956,512 A * | 9/1990 | Nissfolk | .............. | C10M 107/02 585/521 |
| 2011/0028666 A1 | 2/2011 | Mattmann et al. | | |
| 2020/0062877 A1 | 2/2020 | Knopf et al. | | |

FOREIGN PATENT DOCUMENTS

| | | | | |
|---|---|---|---|---|
| CN | 107245118 A | 10/2017 | | |
| CN | 107488242 A | 12/2017 | | |
| CN | 107583248 A | 1/2018 | | |
| CN | 107586248 A | 1/2018 | | |
| CN | 109593591 A | 4/2019 | | |
| CN | 105944652 B | 4/2020 | | |
| CN | 108251155 B | 4/2020 | | |
| CN | 111013511 A | 4/2020 | | |
| EP | 1694439 B1 * | 1/2016 | .............. | B01J 27/32 |
| JP | H06166637 A | 6/1994 | | |
| RU | 2632195 C2 | 10/2017 | | |
| RU | 2652805 C2 | 5/2018 | | |

OTHER PUBLICATIONS

Machine translation of CN 107586248 A H, published on Jan. 16, 2018 and provided in IDS filed on Oct. 20, 2022 (Year: 2018).*
CN 103387628 A M, with machine translation, published on Nov. 13, 2013 (Year: 2018).*

* cited by examiner

APPARATUS AND PROCESS FOR PREPARING POLYALPHA-OLEFINS

This is a national stage of International Application No. PCT/CN2021/088330, now WO 2021/213367, filed on Apr. 20, 2021, and claims foreign priority to Chinese Patent Application CN202010309683.4, filed on Apr. 20, 2020, the entire contents of all of which are incorporated herein by reference.

TECHNICAL FIELD

The present invention relates to an apparatus and a process for preparing polyalpha-olefins, in particular to an apparatus and a process for preparing polyalpha-olefins by using a microchannel reactor.

BACKGROUND TECHNOLOGY

Polyalpha-olefins are usually obtained by polymerizing one or more linear alpha-olefins through oligomerization reaction under the action of catalysts. The hydrogenated polyalpha-olefins obtained by separation and hydrogenation of polyalpha-olefins can be used for blending into high-quality synthetic base oils. Polyalpha-olefin synthetic base oil, also known as PAO synthetic base oil, has excellent properties such as high viscosity index, ultra-low pour point, excellent thermal and oxidative stability, and high flash point, so it has comprehensive uses. PAO synthetic base oils are classified according to their kinematic viscosities at 100° C. The mainstream products include PAO4, PAO6, PAO8, PAO10, PAO40, PAO100, and the like. Among them, the low-viscosity PAOs with a kinematic viscosity at 100° C. between 4 and 8 cSt are most widely used, mainly for blending into various types of high-grade engine oils. The use of low-viscosity PAOs can reduce engine cold torque loss while extending drain intervals and improving fuel economy.

The conventional process for preparing polyalpha-olefins usually uses a Lewis acid catalyst system to allow alpha-olefins to undergo the oligomerization reaction, and polymers with different degrees of polymerization will be formed during the reaction. At present, the catalysts used in the production of low-viscosity poly-alpha-olefins in the industry are mainly $BF_3$-auxiliary catalysts. Batch or continuous stirred tank reactors are used in typical production processes. In the oligomerization reaction system in which alpha-olefins are catalyzed by $BF_3$-auxiliary, $BF_3$ in the gas phase needs to be fully dispersed and mixed with auxiliary and alpha-olefins in the liquid phase, a part thereof dissolves to form an active cationic catalyst and then initiates the alpha-olefin oligomerization reaction. $BF_3$ dissolution and interphase mass transfer determine the macroscopic reaction rate, the conversion, and the like. In addition, if the reaction time is too short, the olefin conversion tends to be low and the product yield is not high. If the reaction time is too long, the formed alpha-olefin oligomer may undergo side reactions such as a secondary polymerization reaction that increases the degree of polymerization and an isomerization reaction that causes a decrease in the viscosity index.

U.S. Pat. No. 4,045,508A discloses a method for the continuous preparation of polyalpha-olefins, which is characterized by combining a stirred reactor and a tubular reactor to control a multi-step polymerization process. However, this process leads to more secondary polymerization reaction of oligomers, and the content of trimers is greatly reduced.

CN104370675B discloses a process for preparing polyalpha-olefins in a continuous manner, the process introduces alpha-olefins into a glassy microchannel continuous reactor in a continuous manner, and conducts a polymerization reaction in the presence of an aluminum compound catalyst and an auxiliary agents to produce polyalpha-olefins. This process consumes a large amount of catalyst and requires a higher reaction temperature.

Furthermore, the batch stirred tank type reaction process reported in the prior art has the defects of large volume of the stirred tank reactor, large occupied area, very strict requirements on the control of process parameters, complex process operation, long reaction time and production period and the like, however the continuous preparation process also cannot realize ideal conversion and selectivity, and the two processes cannot well treat the catalyst in the product. Therefore, there is a need in the art for an apparatus and method for preparing alpha-olefin oligomers, which is high in conversion, high in selectivity, simple in process, low in investment cost, and safe and environmentally friendly.

It is noted that the information disclosed in the foregoing background section is only for enhancing the understanding of the background of the present invention and therefore it may contain information that does not form the prior art that is already known to a person of ordinary skill in the art.

SUMMARY OF THE INVENTION

The present invention provides an apparatus and process for preparing polyalpha-olefins.

Specifically, the present invention comprises to the following aspects.

In the first aspect, the present invention provides an apparatus for preparing polyalpha-olefins.

An apparatus for preparing polyalpha-olefins of the present invention comprises an input unit 1, a microchannel reactor 2, and a post-treatment unit 3 that are successively connected, the input unit comprises a mixer and/or pipeline (s) for delivering an olefin raw material, an auxiliary feed and a $BF_3$ catalyst to microchannel reactor 2, the input unit 1 at least comprises a mixer for mixing at least a part of the auxiliary feed and at least a part of the $BF_3$ catalyst and a pipeline for individually feeding at least a part of the $BF_3$ catalyst to the microchannel reactor 2.

According to the apparatus of the present invention, the mixer in the input unit 1 can be a static and/or dynamic mixer, preferably a static mixer, more preferably a static mixer with enhanced mixing. Optionally, the structure and parameter of the mixer is as follows: the working temperature is 20 to 200° C., and the upper limit for the working pressure does not exceed 20 MPa. When two or more mixers are used, these mixers can be connected in parallel, in series, or both in parallel and in series. The mixer may optionally have a heat exchange layer. The mixer may optionally have a filler; the filler in the mixer may be selected from Pall ring, ceramic ball, regular filler, corrugated filler, wire mesh or plastic ring.

In one embodiment of the present invention, according to the apparatus of the present invention, the input unit 1 can comprise a mixer for mixing a part of the $BF_3$ catalyst, a part of the auxiliary feed and a part of the olefin raw material, and pipelines for individually passing each of the residue of the $BF_3$ catalyst, the residue of the auxiliary feed and the residue of the olefin raw material, based on the feedstock type, into the microchannel reactor 2 (hereinafter, also known as configuration mode 1).

In one embodiment of the present invention, according to the apparatus of the present invention, optionally, the input unit 1 comprises a mixer for mixing a part of the $BF_3$ catalyst and the whole auxiliary feed, a pipeline for individually passing the residue of the $BF_3$ catalyst into the microchannel reactor 2, and a pipeline for individually passing the whole olefin raw material into the microchannel reactor 2 (hereinafter, also known as configuration mode 2).

In one embodiment of the present invention, according to the apparatus of the present invention, optionally, the input unit 1 comprises a mixer for mixing a part of the $BF_3$ catalyst and a part of the auxiliary feed, and pipelines for individually passing each of the residue of the $BF_3$ catalyst, the residue of the auxiliary feed and the whole olefin raw material into the microchannel reactor 2 (hereinafter, also known as configuration mode 3).

In one embodiment of the present invention, according to the apparatus of the present invention, optionally, the input unit 1 comprises a mixer for mixing a part of the $BF_3$ catalyst, a part of the auxiliary feed and the whole olefin raw material, and pipelines for individually passing each of the residue of the $BF_3$ catalyst, and the residue of the auxiliary feed into the microchannel reactor 2 (hereinafter, also known as configuration mode 4).

In one embodiment of the present invention, according to the apparatus of the present invention, optionally, the input unit 1 comprises a mixer for mixing a part of the $BF_3$ catalyst, the whole auxiliary feed and a part of the olefin raw material, and pipelines for individually passing each of the residue of the $BF_3$ catalyst, and the residue of the olefin raw material into the microchannel reactor 2 (hereinafter, also known as configuration mode 5).

In one embodiment of the present invention, according to the apparatus of the present invention, optionally, the input unit 1 comprises a mixer for mixing a part of the $BF_3$ catalyst, the whole auxiliary feed and the whole olefin raw material, and a pipeline for individually passing the residue of the $BF_3$ catalyst into the microchannel reactor 2 (hereinafter, also known as configuration mode 6).

In one embodiment of the present invention, according to the apparatus of the present invention, preferably, in the case that the $BF_3$ catalyst, the auxiliary feed and the olefin raw material are mixed in the input unit 1 (namely, the above-mentioned configuration mode 1, configuration mode 4, configuration mode 5, configuration mode 6), the input unit 1 comprises a first mixer for mixing any two of the above three feedstocks, and a second mixer for mixing the mixture from the first mixer and the residual one feedstock, wherein the first mixer is communicated with the second mixer, and the second mixer is communicated with the microchannel reactor 2. More preferably, the input unit 1 comprises a first mixer for mixing one of the olefin raw material and the $BF_3$ gas with the auxiliary feed, and a second mixer for further mixing the mixture with the other of the olefin raw material and the $BF_3$ gas. For example, the input unit 1 comprises a first mixer for mixing the olefin raw material with the auxiliary feed, and a second mixer for mixing the mixture with the $BF_3$ gas; or the input unit 1 comprises a first mixer for mixing the $BF_3$ gas with the auxiliary feed, and a second mixer for mixing the mixture with the olefin raw material. The input unit 1 further comprises the pipelines that are communicated with the microchannel reactor 2 to which the residue of the feedstocks are each individually fed.

In one embodiment of the present invention, according to the apparatus of the present invention, preferably, the input unit 1 comprises first mixer for mixing a part of the $BF_3$ catalyst and the whole auxiliary feed, the second mixer for mixing the stream obtained after the mixing in the first mixer and the whole olefin raw material, and a pipeline for individually passing the residue of the $BF_3$ catalyst into the microchannel reactor 2. Among others, the first mixer is communicated with the second mixer, and the second mixer is communicated with the microchannel reactor 2.

According to the apparatus of the present invention, the microchannel reactor 2 can allow the microchannel reaction therein of the mixed stream from the mixer in the input unit and the streams from each individual pipelines in the input unit. The number of the microchannel reactor 2 may be one or more, preferably one, two, three, four, five or six. When two or more microchannel reactors 2 are used, these microchannel reactors 2 can be connected in series, in parallel, or both in parallel and in series.

The structure and parameter of the microchannel reactor 2 is as follows: the reaction channel is 2-10000 channels in parallel, the working temperature range is −70 to 300° C., the allowable maximum reaction pressure does not exceed 20 MPa, the allowable maximum heat transfer medium pressure does not exceed 10 MPa; the fluid channel volume without mixing inserts is 0.1-20000 L, the volume flow rate is 1-50000 L/h. Further preferably, the reaction channel is 2-5000 channels, more preferably 2-500 channels. For example, the reaction channel can be of 2, 3, 4, 5, 6, 7, 8, 9, 10, 11, 12, 13, 14, 15, 16, 17, 18, 19, 20, 21, 22 channels or the like. In the microchannel reactor of the present invention, each reaction channel can have a cross-sectional area of 1 $mm^2$ to 150 $mm^2$, and a length of 50 mm to 5000 mm. Preferably, a mixing member that can promote the mixing of the reaction streams is provided in each reaction channel, and the mixing member is a member well known in the art that can promote the mixing of the reaction streams and enhance the turbulence, and it can be a mixing disk, and a first mixing member and a second mixing member according to the present invention. Preferably, the microchannel reactor of the present invention is provided with a header pipe for introducing the reaction gas and branch pipes for distributing the reaction gas to each reaction channel.

In one embodiment of the present invention, according to the apparatus of the present invention, a preferred microchannel reactor 2 (hereinafter sometimes also referred to as the preferred microchannel reactor of the present invention) includes:

- a shell 003; a feeding zone 023, a mixing zone 008, a reaction zone 009, and a collection zone 024 are successively arranged and communicated along a first direction in the shell 003, wherein the shell 003 is provided with a feed pipe 002 communicated with the feeding zone 023 and a discharge pipe 001 communicated with the collection zone 024, and the mixing zone 008 is provided with a mixing channel 014 extending along the first direction;
- a fluid distribution pipe 017, the fluid distribution pipe 017 is extended from the exterior of the shell 003 into the mixing channel 014, the fluid distribution pipe 017 is connected with a fluid distributor 016 at an end of the mixing channel 014;

The feed pipe 002 is used to input the feedstock from the input unit 1, the fluid distribution pipe 017 is connected to the pipeline for the individually fed $BF_3$ catalyst of the input unit 1 and can be used to input the $BF_3$ catalyst, and the discharge pipe 001 is connected to the high-pressure separation unit 3.

In one embodiment of the present invention, there can be two or more feed pipes 002, the number of which corresponds to the pipelines from the input unit 1, except for the pipeline for individually feeding the $BF_3$ catalyst. These pipelines include the pipeline for individually feeding to the microchannel reactor (except for individually feeding the $BF_3$ catalyst) and the pipeline for connecting the last stage mixer to the microchannel reactor. In the present invention, the above-mentioned "last stage mixer" refers to a mixer, in which the feedstock is mixed and which is then connected to the microchannel reactor through a pipeline, in the input unit 1. In the present invention, the first direction is the flow direction of the stream, and it may be a horizontal direction, an elevation direction, or the like. The elevation direction is preferred, and the elevation direction from bottom to top is more preferred.

In one embodiment of the present invention, in the present invention, the mixing zone 008 and the feeding zone 023 can be partitioned by a first partition plate 019. The first partition plate 019 is provided with a plurality of through holes, and each through hole is aligned with the mixing channel 014, so that the mixing zone 008 is communicated with the feeding zone 023.

In one embodiment of the present invention, according to the apparatus of the present invention, preferably, the feed pipe is connected to the mixer of the input unit 1 to input a mixture of at least two of at least a part of the olefin raw material, at least a part of the auxiliary feed and at least a part of the $BF_3$ catalyst.

In one embodiment of the present invention, preferably, the fluid distributor is at least one selected from powder sintered body with micropores, mesoporous foam material, wire mesh, and tube with microslits or micropores. Preferably, the fluid distributor is a cylindrical powder sintered body with micropores.

In one embodiment of the present invention, preferably, the fluid distributor has a cross-sectional area of 0.01 $cm^2$–200 $cm^2$, and a length of 1 mm-2000 mm.

In one embodiment of the present invention, the mixing channel has a circular cross-section. The mixing channel has a cross-sectional area of 0.05 $cm^2$–400 $cm^2$, and a length of 50 mm-5000 mm.

In the present invention, the length and the cross-sectional area of the mixing channel 014 are both greater than the length and the cross-sectional area of the fluid distributor 016.

In one embodiment of the present invention, the mixing zone is provided with 2-100 (preferably 2-50, more preferably 2-10) mixing channels, the fluid distribution pipe 017 includes a main pipe extending from the exterior of the shell into the feeding zone and branch pipes extending from the feeding zone into each mixing channel 014 with fluid distributors 016 connected to branch pipe ends.

In one embodiment of the present invention, in the mixing channel 014, a first mixing member 015 is disposed downstream of the fluid distributor 016.

In one embodiment of the present invention, the first mixing member 015 is provided with a main flow portion and a branch flow portion that are alternately arranged and communicated along the first direction, the main flow portion is provided with a single main flow passage, and the branch flow portion is provided with a plurality of branch flow passages. Preferably, a collection cavity communicated with a plurality of branch flow passages is disposed downstream of the branch flow portion. The first mixing member can be formed by splicing a plurality of plate members (the number can be 2-100, preferably 2-50, more preferably 10-30) (the thickness is about 0.2 mm-10 mm) arranged along a first direction, and the structures such as holes and cavities that correspond to the main flow passage 0001, the branch flow passage 0002 and the collection cavity 0003 are formed on each plate member, which is convenient for processing and manufacturing.

In one embodiment of the present invention, the mixing zone can comprise a first heat exchange cavity 013 disposed in the shell, the mixing channel is disposed in the first heat exchange cavity, the shell is provided with a first heat exchange medium inlet 004 and a first heat exchange medium outlet 005 that are communicated with the first heat exchange cavity.

In one embodiment of the present invention, the volumetric ratio of the first heat exchange cavity to the mixing channel is 2-50; preferably, the volumetric ratio of the first heat exchange cavity to the mixing channel is 5-30. In the mixing zone 008, the mixing channel 014 and the first heat exchange cavity 013 are isolated from each other and not communicated with each other, but the heat conduction can be achieved between each other, and pipe fittings with good thermal conductivity can be used in the mixing channel 014.

In one embodiment of the present invention, a transition zone 020 is provided between the mixing zone and the reaction zone, the transition zone is provided with a stabilization channel 021 with constant cross-section and a diffusion channel 022 with gradually enlarged cross-section arranged and communicated along the first direction, the stabilization channel is communicated with the mixing channel, the diffusion channel is communicated with the reaction zone.

In one embodiment of the present invention, a discharge pipe 018 extending to the exterior of the shell is connected to the stabilization channel.

In one embodiment of the present invention, the diffusion channel is provided with a diffusion plate with meshes or slits.

In one embodiment of the present invention, the two ends of the transition zone 020 are respectively provided with partition plates with through holes, so as to be respectively isolated from the mixing zone 008 (mainly the first heat exchange cavity 013) and the reaction zone 009 (mainly the second heat exchange cavity 012), and connected to each mixing channel 014 and each reaction channel 010 through each through hole on each partition plate respectively, and the diffusion channel 022 and the stabilization channel 021 can be pipe fittings provided between two partition plates.

In one embodiment of the present invention, the reaction zone is provided with a plurality of parallel reaction channels extending along the first direction and communicated with the mixing channel via the stabilization channel 021 and the diffusion channel 022. The reaction channel has a cross section in at least one of circular, rectangular and triangular shapes. The number of reaction channels is, for example, 2-10000 channels, preferably 2-5000 channels, and more preferably 2-500 channels.

In one embodiment of the present invention, the reaction channel is provided with a second mixing member, and the second mixing member includes a base strip extending along the first direction and a tooth element connected to the base strip and extended transversely to the base strip; the tooth element is of at least one of triangular, arcual, wavy, and spiral shapes. Preferably, the tooth element is of triangular shape, and on one side of the triangle adjacent to the base strip, one corner is connected to the base strip, and the other corner is 0.01 mm-20 mm away from the base strip. In one embodiment of the present invention, each of reaction channels is each independently provided with a plurality of the second mixing members (the number can be 2-100, preferably 2-50, more preferably 10-30), which are stacked at intervals, and the tooth elements of the second mixing member are staggered with each other.

Preferably, the cross-section of the reaction channel is rectangular, and the tooth elements extend between a set of opposite sides of the rectangle.

In one embodiment of the present invention, the reaction channel has a cross-sectional area of 1 $mm^2$-150 $mm^2$, and a length of 50 mm-5000 mm, the minimum distance between the reaction channels is 1 mm-50 mm, and the second mixing member has a thickness of 0.1 mm-3 mm, and the spacing between adjacent tooth elements is 1 mm-50 mm, preferably, the reaction channel has a length of 100 mm-3000 mm, and a minimum spacing between the reaction channels of 3 mm-30 mm, the second mixing member has a thickness of 0.2 mm-2 mm, and the spacing between adjacent tooth elements is 1.5 mm-20 mm.

In one embodiment of the present invention, the reaction zone can be provided with a second heat exchange cavity 012 disposed in the shell, the reaction channel is disposed in the second heat exchange cavity, the shell is provided with a second heat exchange medium inlet 006 and a second heat exchange medium outlet 007 that are communicated with the second heat exchange cavity.

In one embodiment of the present invention, the volumetric ratio of the second heat exchange cavity to the reaction channel is 2-50; preferably, the volumetric ratio of the second heat exchange cavity to the reaction channel is 5-30.

In one embodiment of the present invention, the second heat exchange cavity 012 may be mainly formed by the shell 003, and at two ends are respectively the second partition plate 025 between the reaction zone 009 and the collection zone 024 and the partition plate between the reaction zone 009 and the transition zone 020.

According to the apparatus of the present invention, the post-treatment unit 3 enables the post-treatment of the stream entering therein to produce a polyolefin product. The post-treatment unit 3 can be one or more of an adsorption device, a centrifugation device, a sedimentation device, an alkaline washing device, a water washing device and a gas-liquid separation device.

In one embodiment of the present invention, according to the apparatus of the present invention, in the adsorption device, the catalyst in the stream is removed after the adsorption with the adsorbent in the adsorption device to produce a crude polyolefin product, which can be further subjected to the post-treatment to produce the final polyolefin product. The adsorbent can be one or more of metal oxide, ion exchange resin and activated bleaching earth. The metal oxide is preferably one or more of potassium oxide, calcium oxide, sodium oxide, magnesium oxide, aluminum oxide and barium oxide. The adsorption device can be one or more of fluidized bed, fixed bed and continuous stirred tank.

In one embodiment of the present invention, according to the apparatus of the present invention, the sedimentation device or centrifugation device enables the separation of the stream obtained after the polymerization reaction into a light liquid phase and a heavy liquid phase. The light liquid phase is a crude polyolefin product, and can be subjected to a further post-treatment to produce a final polyolefin product; the heavy liquid phase contains a complex of auxiliary feed and $BF_3$ and an unreacted olefin raw material, and can be returned to the input unit or the microchannel reactor for the recycled use. Among others, the centrifugation device is preferably a centrifuge, which can be one or more of a disc-bowl centrifuge, a tubular centrifuge and a horizontal centrifuge.

In one embodiment of the present invention, according to the apparatus of the present invention, the alkaline washing device can pass the stream obtained after the polymerization reaction into an alkaline aqueous solution to remove the catalyst, and the resulting stream is then subjected to the water-washing, the liquid-liquid separation, and the drying to produce the final polyolefin product.

In one embodiment of the present invention, according to the apparatus of the present invention, the water washing device can pass the stream obtained after the polymerization reaction into water to remove the catalyst by water washing, and the resulting stream is then subjected to the liquid-liquid separation, and the drying to produce the final polyolefin product.

In one embodiment of the present invention, according to the apparatus of the present invention, the gas-liquid separation device can remove the catalyst from the stream obtained after the polymerization reaction by the gas liquid separation, and the resulting liquid phase obtained after the gas liquid separation is then subjected to the post-treatment to produce the final polyolefin product.

The gas phase obtained after the gas-liquid separation ($BF_3$ gas) can be recycled for use. According to the apparatus of the present invention, based on the total mass of the $BF_3$ in the microchannel reactor 2, the mass ratio of the $BF_3$ catalyst directly fed to the microchannel reactor 2 to the $BF_3$ catalyst mixed in the mixer of the input unit 1 is 90-10:10-90, preferably 80-40:20-60, more preferably 70-50:30-50.

In the present invention, the total mass of the $BF_3$ in the microchannel reactor 2 refers to the total mass of the $BF_3$ in the complex formed by complexing with the auxiliary feed and the free $BF_3$ in the microchannel reactor 2. That is to say, it is the total mass of the $BF_3$ in the stream delivered from the last stage mixer of the input unit 1 to the microchannel reactor (the total mass of the $BF_3$ in the complex and the free $BF_3$ in the stream), and the mass of the $BF_3$ catalyst independently fed to the microchannel reactor. Namely, it is the total mass of the $BF_3$ fed to the input unit 1 and the $BF_3$ individually fed to the microchannel reactor 2. In the present invention, the $BF_3$ catalyst refers to the free $BF_3$ that is not complexed with the auxiliary feed, also known as the $BF_3$ gas, or $BF_3$.

The apparatus for preparing polyalpha-olefins of the present invention can be used to synthesize the polyalpha-olefin synthetic oil. The apparatus of the present invention can realize flexible and rapid mixing of the catalyst, the auxiliary feed and the olefin raw material, and have the advantages of high polymerization reaction speed, good mass and heat transfer effects, high reaction conversion, good product selectivity and excellent performance, thereby being suitable for large-scale industrial production.

The apparatus for preparing polyalpha-olefins using the preferred microchannel reactor in the present invention can realize continuous and efficient mixing of the reaction system, maintain the fluid to flow in a plug flow-like manner and mix, ensure the consistency of the residence time of the reaction fluid as much as possible, and avoid the undesirable product selectivity due to residence time distribution.

In a second aspect, the present invention provides a process for preparing polyalpha-olefins.

The process for preparing polyalpha-olefins of the present invention comprises: a $BF_3$ catalyst, an auxiliary feed and an olefin raw material are passed into a microchannel reactor through an input unit, and subjected to the polymerization reaction in the microchannel reactor and then the post-treatment to produce a polyolefin product, wherein in the input unit, at least a part of the auxiliary feed and at least a part of the $BF_3$ catalyst are mixed, and at the same time, at least a part of the $BF_3$ catalyst is individually fed to the microchannel reactor.

According to the process of the present invention, preferably, in the input unit, at least a part of the olefin raw material, at least a part of the auxiliary feed and at least a part of the $BF_3$ catalyst are mixed.

In one embodiment of the present invention, the olefin in the olefin raw material is one or more of $C_3$-$C_{20}$ alpha-olefins, preferably one or more of $C_5$-$C_{15}$ alpha-olefins, more preferably one or more of $C_7$-$C_{14}$ alpha-olefins. For example, it can be the olefins commonly used in the preparation of PAO synthetic base oils, such as nonene and decene.

In one embodiment of the present invention, the olefin raw material can further contain $C_5$-$C_{20}$ alkane and/or $C_1$-$C_{20}$ oxygen-containing compound as solvent. Relative to the total mass of the olefin raw material, the mass fraction of the $C_5$-$C_{20}$ alkane can be 0-80%, preferably 0.5-50%, most preferably 1-30%. Relative to the total mass of the olefin raw material, the mass fraction of the $C_1$-$C_{20}$ oxygen-containing compound can be 0-20%, preferably 0-10%, most preferably 0.001-5%.

The $C_5$-$C_{20}$ alkane can be one or more of n-alkane, iso-alkane and cycloalkane; the $C_1$-$C_{20}$ oxygen-containing compound can be one or more of n-alkanol, iso-alcohol and ketone. A Fischer-Tropsch olefin raw material can be used as the mixture of $C_3$-$C_{20}$ alpha-olefin, $C_5$-$C_{20}$ alkane, and $C_1$-$C_{20}$ oxygen-containing compound (namely the olefin raw material).

In one embodiment of the present invention, the auxiliary feed can be a commonly used auxiliary feed that can be used as an electron donor of $BF_3$, and can be one or more of an alcohol having a carbon atom number of 1-20, an ether having a carbon atom number of 1-20, an aldehyde having a carbon atom number of 1-20, a ketone having a carbon atom number of 1-20, an ester having a carbon atom number of 1-30, a carboxylic acid having a carbon atom number of 1-20 and a phenol having a carbon atom number of 1-20, preferably an alcohol having a carbon atom number of 1-10, more preferably an alcohol having a carbon atom number of 3-5, for example, one or more of n-propanol, iso-propanol, n-butanol, iso-butanol, n-pentanol and iso-pentanol.

In one embodiment of the present invention, according to the process of the present invention, preferably, in the microchannel reactor, the mass ratio of the auxiliary feed:the olefin raw material:the total of the $BF_3$ catalyst is 1:1-1000:1-500 (preferably 1:1-500:1-200, most preferably 1:10-250:1-100). The mass ratio of the auxiliary feed:the olefin raw material:the total of the $BF_3$ catalyst refers to the mass ratio of the raw materials when all the raw materials are fed into the microchannel reactor, i.e., it can be the proportion, based on the individual calculation, of reaction raw materials in the stream immediately downstream of the fluid distributor. In the present invention, the mass of the auxiliary feed includes the mass of the auxiliary in the $BF_3$ complex, and the mass of $BF_3$ includes the mass of $BF_3$ in the $BF_3$ complex.

In one embodiment of the present invention, according to the process of the present invention, in the input unit, a part of the $BF_3$ catalyst, a part of the auxiliary feed and a part of the olefin raw material can be mixed and passed into the microchannel reactor, and, the residual $BF_3$ catalyst, the residual auxiliary feed and the residual olefin raw material, based on the feedstock type, are each individually passed into the microchannel reactor (hereinafter, also known as feeding mode 1).

In one embodiment of the present invention, according to the process of the present invention, in the input unit, a stream obtained by mixing a part of the $BF_3$ catalyst and the whole auxiliary feed can be passed into the microchannel reactor, and, each of the residue of the $BF_3$ catalyst and the whole olefin raw material is individually passed into the microchannel reactor (hereinafter, also known as feeding mode 2). Preferably, in the case of mixing a part of the $BF_3$ catalyst and the whole auxiliary feed in the mixer, the speed for passing a part of the $BF_3$ catalyst into the mixer is 1-100000 L/h, preferably 1-80000 L/h, most preferably 1-30000 L/h, the speed for passing the whole auxiliary feed into the mixer is 0.01-1000 L/h, preferably 0.1-800 L/h, most preferably 0.2-500 L/h, the speed for passing the mixture obtained after mixing a part of the $BF_3$ catalyst and the whole auxiliary feed in the mixer into the microchannel reactor is 0.01-2000 L/h, preferably 0.1-1600 L/h, most preferably 0.2-1000 L/h, the speed for individually passing the residue of the $BF_3$ catalyst into the microchannel reactor is 1-150000 L/h, preferably 5-100000 L/h, most preferably 10-50000 L/h, the speed for individually passing the whole olefin raw material into the microchannel reactor is 10-5000 L/h, preferably 20-4000 L/h, most preferably 40-2500 L/h.

In one embodiment of the present invention, according to the process of the present invention, in the input unit, the stream obtained by mixing a part of the $BF_3$ catalyst and a part of the auxiliary feed can be passed into the microchannel reactor, and each of the residue of the $BF_3$ catalyst, the residue of the auxiliary feed, and the whole olefin raw material is individually passed into the microchannel reactor (hereinafter, also known as feeding mode 3). Preferably, in the case of mixing a part of the $BF_3$ catalyst and a part of the auxiliary feed in the mixer, the speed for passing a part of the $BF_3$ catalyst into the mixer is 1-100000 L/h, preferably 1-80000 L/h, most preferably 1-30000 L/h, the speed for passing a part of the auxiliary feed into the mixer is 0.01-800 L/h, preferably 0.1-500 L/h, most preferably 0.2-400 L/h, the speed for passing the mixture obtained by mixing a part of the $BF_3$ catalyst and a part of the auxiliary feed in the mixer into the microchannel reactor is 0.01-1600 L/h, preferably 0.1-1400 L/h, most preferably 0.2-800 L/h, the speed for individually passing the residue of the $BF_3$ catalyst into the microchannel reactor is 1-120000 L/h, preferably 5-80000 L/h, most preferably 10-40000 L/h, the speed for passing the residue of the auxiliary feed into the mixer is 0.01-200 L/h, preferably 0.1-150 L/h, most preferably 0.2-100 L/h, the speed for individually passing the whole olefin raw material into the microchannel reactor is 10-5000 L/h, preferably 20-4000 L/h, most preferably 40-2500 L/h).

In one embodiment of the present invention, according to the process of the present invention, in the input unit, the stream obtained by mixing a part of the $BF_3$ catalyst, a part of the auxiliary feed and the whole olefin raw material can be passed into the microchannel reactor, and each of the residue of the $BF_3$ catalyst, and the residue of the auxiliary feed is individually passed into the microchannel reactor (hereinafter, also known as feeding mode 4). Preferably, in the case of mixing a part of the $BF_3$ catalyst, a part of the auxiliary feed, and the whole olefin raw material in the mixer, the speed for passing a part of the $BF_3$ catalyst into the mixer is 1-100000 L/h, preferably 1-80000 L/h, most preferably 1-30000 L/h, the speed for passing a part of the auxiliary feed into the mixer is 0.01-800 L/h, preferably 0.1-500 L/h, most preferably 0.2-400 L/h, the speed for passing the whole olefin raw material into the mixer is 10-5000 L/h, preferably 20-4000 L/h, most preferably 40-2500 L/h, the speed for passing the mixture obtained by mixing a part of the $BF_3$ catalyst, a part of the auxiliary feed, and the whole olefin raw material in the mixer into the microchannel reactor is 0.01-6000 L/h, preferably 0.1-4600 L/h, most preferably 0.2-3000 L/h, the speed for individually passing the residue of the $BF_3$ catalyst into the microchannel reactor is 1-150000 L/h, preferably 5-100000 L/h, most preferably 10-50000 L/h, the speed for individually passing the residue of the auxiliary feed into the microchannel reactor is 0.01-200 L/h, preferably 0.1-150 L/h, most preferably 0.2-100 L/h). In one embodiment of the present invention, according to the process of the present invention, in the input unit, the stream obtained by mixing a part of the $BF_3$ catalyst, the whole auxiliary feed and a part of the olefin raw material can be passed into the microchannel reactor, and each of the residue of the $BF_3$ catalyst, and the residue of the olefin raw material is individually passed into the microchannel reactor (hereinafter, also known as feeding mode 5). Preferably, in the case of mixing a part of the $BF_3$ catalyst, the whole auxiliary feed and a part of the olefin raw material in the mixer, the speed for passing a part of the $BF_3$ catalyst into the mixer is 1-100000 L/h, preferably 1-80000 L/h, most preferably 1-30000 L/h, the speed for passing the whole auxiliary feed into the mixer is 0.01-1000 L/h, preferably 0.1-800 L/h, most preferably 0.2-500 L/h, the speed for passing a part of the olefin raw material into the mixer is 1-2000 L/h, preferably 5-1000 L/h, most preferably 10-500 L/h, the speed for passing the mixture obtained by mixing a part of the $BF_3$ catalyst, the whole auxiliary feed and a part of the olefin raw material in the mixer into the microchannel reactor is 0.01-3000 L/h, preferably 0.1-1800 L/h, most preferably 0.2-1000 L/h, the speed for individually passing the residue of the $BF_3$ catalyst into the microchannel reactor is 1-150000 L/h, preferably 5-100000 L/h, most preferably 10-50000 L/h, the speed for individually passing the residue of the olefin raw material into the microchannel reactor is 9-3000 L/h, preferably 15-3000 L/h, most preferably 30-2000 L/h).

In one embodiment of the present invention, according to the process of the present invention, in the input unit, the stream obtained by mixing a part of the $BF_3$ catalyst, the whole auxiliary feed, and the whole olefin raw material can be passed into the microchannel reactor, and, the residue of the $BF_3$ catalyst is individually passed into the microchannel reactor (hereinafter, also known as feeding mode 6). Preferably, in the case of mixing a part of the $BF_3$ catalyst, the whole auxiliary feed, and the whole olefin raw material in the mixer, the speed for passing a part of the $BF_3$ catalyst into the mixer is 1-100000 L/h, preferably 1-80000 L/h, most preferably 1-30000 L/h, the speed for passing the whole auxiliary feed into the mixer is 0.01-1000 L/h, preferably 0.1-800 L/h, most preferably 0.2-500 L/h, the speed for passing the whole olefin raw material into the mixer is 10-5000 L/h, preferably 20-4000 L/h, most preferably 40-2500 L/h, the speed for passing the mixture obtained by mixing a part of the $BF_3$ catalyst, the whole auxiliary feed, and the whole olefin raw material in the mixer into the microchannel reactor is 10-6000 L/h, preferably 0.1-4600 L/h, most preferably 0.2-3000 L/h, the speed for individually passing the residue of the $BF_3$ catalyst into the microchannel reactor is 1-150000 L/h, preferably 5-100000 L/h, most preferably 10-50000 L/h).

In one embodiment of the present invention, according to the process of the present invention, preferably, in the input unit, a part of the $BF_3$ catalyst and the whole auxiliary feed can be subjected to a first mixing in the first mixer, then the stream obtained after the first mixing is subjected to a second mixing with the whole olefin raw material in the second mixer, and the stream obtained after the second mixing is passed into the microchannel reactor, and, the residue of the $BF_3$ catalyst is individually passed into the microchannel reactor; preferably, when a part of the $BF_3$ catalyst and the whole auxiliary feed are subjected to the first mixing in the first mixer, the speed for passing a part of the $BF_3$ catalyst into the first mixer is 1-100000 L/h, preferably 1-80000 L/h, most preferably 1-30000 L/h, the speed for passing the whole auxiliary feed into the first mixer is 0.01-1000 L/h, preferably 0.1-800 L/h, most preferably 0.2-500 L/h, the stream obtained after the first mixing is then subjected to a second mixing with the whole olefin raw material in the second mixer, the speed for passing the stream obtained after the first mixing into the second mixer is 0.01-2000 L/h, preferably 0.1-1600 L/h, most preferably 0.2-1000 L/h, the speed for passing the whole olefin raw material into the second mixer is 10-5000 L/h, preferably 20-4000 L/h, most preferably 40-2500 L/h, the speed for passing the stream obtained after the second mixing into the microchannel reactor is 10-7000 L/h, preferably 20-5600 L/h, most preferably 40-3500 L/h, the speed for individually passing the residue of the $BF_3$ catalyst into the microchannel reactor is 1-150000 L/h, preferably 5-100000 L/h, most preferably 10-50000 L/h.

In one embodiment of the present invention, according to the process of the present invention, preferably, the reaction temperature in the microchannel reactor is 0-120° C., preferably 10-80° C., more preferably 20-60° C. According to the process of the present invention, preferably, the reaction pressure in the microchannel reactor is 0.01-10 MPa, preferably 0.01-8 MPa, more preferably 0.1-6 MPa. According to the process of the present invention, preferably, the residence time of the olefin raw material in the microchannel reactor is 1-3600 seconds, preferably 10-1800 seconds, more preferably 15-1000 seconds.

According to the process of the present invention, any of the microchannel reactors as described in the first aspect can be used as the microchannel reactor.

In one embodiment of the present invention, according to the process of the present invention, preferably, the post-treatment method is one or more of adsorption, centrifugation, sedimentation, alkaline washing, water washing, and gas liquid separation method, preferably adsorption. The adsorbent in the adsorption method is preferably one or more of metal oxide, ion exchange resin, activated bleaching earth and molecular sieve, more preferably metal oxide, and the metal oxide is preferably one or more of potassium oxide, calcium oxide, sodium oxide, magnesium oxide, aluminum oxide and barium oxide.

In one embodiment of the present invention, according to the process of the present invention, preferably, in the case that the post-treatment method is a sedimentation or centrifugation, the sedimentation or centrifugation enables the separation of the stream entering the post-treatment unit into a light liquid phase and a heavy liquid phase. The heavy liquid phase contains a complex of auxiliary feed and $BF_3$ and an unreacted olefin raw material, and is optionally returned to the input unit or the microchannel reactor to continue the participation in the continuous reaction. The light liquid phase is a crude polyolefin product, and can be subjected to a further post-treatment. According to the process of the present invention, preferably, fractionation, hydrogenation and optional blending operations are performed on the obtained polyolefin product to obtain a synthetic oil that meets the viscosity grade.

The process of the present invention has the advantages of high polymerization reaction speed, good mass and heat transfer effects, high reaction conversion, good product selectivity and good performance, and is suitable for large-scale industrial production.

In a third aspect, the present invention provides a process for preparing polyalpha-olefins using any of the apparatuses described in the first aspect.

The process for preparing polyalpha-olefins using any of the apparatuses for preparing polyalpha-olefins described in the first aspect according to the present invention comprises: a $BF_3$ catalyst, an auxiliary feed and an olefin raw material are passed into a microchannel reactor through an input unit 1, and subjected to the polymerization reaction in the microchannel reactor and then the post-treatment to produce a polyolefin product, wherein in the input unit 1, at least a part of the auxiliary feed and at least a part of the $BF_3$ catalyst are mixed, and at the same time, at least a part of the $BF_3$ catalyst is individually fed to the microchannel reactor 2.

In one embodiment of the present invention, the olefin in the olefin raw material is one or more of $C_3$-$C_{20}$ alpha-olefins, preferably one or more of $C_5$-$C_{15}$ alpha-olefins, more preferably one or more of $C_7$-$C_{14}$ alpha-olefins. For example, it can be the olefins commonly used in the preparation of PAO synthetic base oils, such as nonene and decene.

In one embodiment of the present invention, the olefin raw material can further contain $C_5$-$C_{20}$ alkane and/or $C_1$-$C_{20}$ oxygen-containing compound as solvent. Relative to the total mass of the olefin raw material, the mass fraction of the $C_5$-$C_{20}$ alkane can be 0-80%, preferably 0.5-50%, most preferably 1-30%. Relative to the total mass of the olefin raw material, the mass fraction of the $C_1$-$C_{20}$ oxygen-containing compound can be 0-20%, preferably 0-10%, most preferably 0.001-5%.

The $C_5$-$C_{20}$ alkane can be one or more of n-alkane, iso-alkane and cycloalkane; the $C_1$-$C_{20}$ oxygen-containing compound can be one or more of n-alkanol, iso-alcohol and ketone. A Fischer-Tropsch olefin raw material can be used as the mixture of $C_3$-$C_{20}$ alpha-olefin, $C_5$-$C_{20}$ alkane, and $C_1$-$C_{20}$ oxygen-containing compound (namely the olefin raw material).

In one embodiment of the present invention, the auxiliary feed can be a commonly used auxiliary feed that can be used as an electron donor of $BF_3$, and can be one or more of an alcohol having a carbon atom number of 1-20, an ether having a carbon atom number of 1-20, an aldehyde having a carbon atom number of 1-20, a ketone having a carbon atom number of 1-20, an ester having a carbon atom number of 1-30, a carboxylic acid having a carbon atom number of 1-20 and a phenol having a carbon atom number of 1-20, preferably an alcohol having a carbon atom number of 1-10, more preferably an alcohol having a carbon atom number of 3-5, for example, one or more of n-propanol, iso-propanol, n-butanol, iso-butanol, n-pentanol and iso-pentanol.

In one embodiment of the present invention, according to the process of the present invention, preferably, in the microchannel reactor, the mass ratio of the auxiliary feed:the olefin raw material:the total of the $BF_3$ catalyst is 1:1-1000:1-500 (preferably 1:1-500:1-200, most preferably 1:10-250:1-100). The mass ratio of the auxiliary feed:the olefin raw material:the total of the $BF_3$ catalyst refers to the mass ratio of the raw materials when all the raw materials are fed into the microchannel reactor, i.e., it can be the proportion, based on the individual calculation, of reaction raw materials in the stream immediately downstream of the fluid distributor. In the present invention, the mass of the auxiliary feed includes the mass of the auxiliary in the $BF_3$ complex, and the mass of $BF_3$ includes the mass of $BF_3$ in the $BF_3$ complex.

In one embodiment of the present invention, according to the process of the present invention, preferably, the reaction temperature in the microchannel reactor 2 is 0-120° C., preferably 10-80° C., more preferably 20-60° C. According to the process of the present invention, preferably, the reaction pressure in the microchannel reactor 2 is 0.01-10 MPa, preferably 0.01-8 MPa, more preferably 0.1-6 MPa. According to the process of the present invention, preferably, the residence time of the olefin raw material in the microchannel reactor 2 is 1-3600 seconds, preferably 10-1800 seconds, more preferably 15-1000 seconds.

In one embodiment of the present invention, according to the process of the present invention, based on the total mass of the $BF_3$ in the microchannel reactor, the mass ratio of the $BF_3$ catalyst directly fed to the microchannel reactor 2 to the $BF_3$ catalyst participated in the mixing in the input unit 1 is 90-10:10-90, preferably 80-40:20-60, more preferably 70-50:30-50.

In one embodiment of the present invention, according to the process of the present invention, preferably, the post-treatment method is one or more of adsorption, centrifugation, sedimentation, alkaline washing, water washing, and gas liquid separation method, preferably adsorption. The adsorbent in the adsorption method is preferably one or more of metal oxide, ion exchange resin, activated bleaching earth and molecular sieve, more preferably metal oxide, and the metal oxide is preferably one or more of potassium oxide, calcium oxide, sodium oxide, magnesium oxide, aluminum oxide and barium oxide.

In one embodiment of the present invention, according to the process of the present invention, preferably, in the case that the post-treatment method is a sedimentation or centrifugation, the sedimentation or centrifugation enables the separation of the stream entering the post-treatment unit into a light liquid phase and a heavy liquid phase. The heavy liquid phase contains a complex of auxiliary feed and $BF_3$ and an unreacted olefin raw material, and is optionally returned to the input unit or the microchannel reactor to continue the participation in the continuous reaction. The light liquid phase is a crude polyolefin product, and can be subjected to a further post-treatment.

According to the process of the present invention, preferably, fractionation, hydrogenation and optional blending operations are performed on the obtained polyolefin product to obtain a synthetic oil that meets the viscosity grade.

The process of the present invention can realize flexible and rapid mixing of the catalyst, the auxiliary feed and the olefin raw material, and have the advantages of high polymerization reaction speed, good mass and heat transfer effects, high reaction conversion, good product selectivity and excellent performance, thereby being suitable for large-scale industrial production.

The process for preparing polyalpha-olefins using the preferred microchannel reactor in the present invention can realize continuous and efficient mixing of the reaction system, maintain the fluid to flow in a plug flow-like manner, ensure the consistency of the residence time of the reaction fluid as much as possible, and avoid the undesirable product selectivity due to residence time distribution.

DESCRIPTION OF THE REFERENCE NUMERALS

Figure 1:
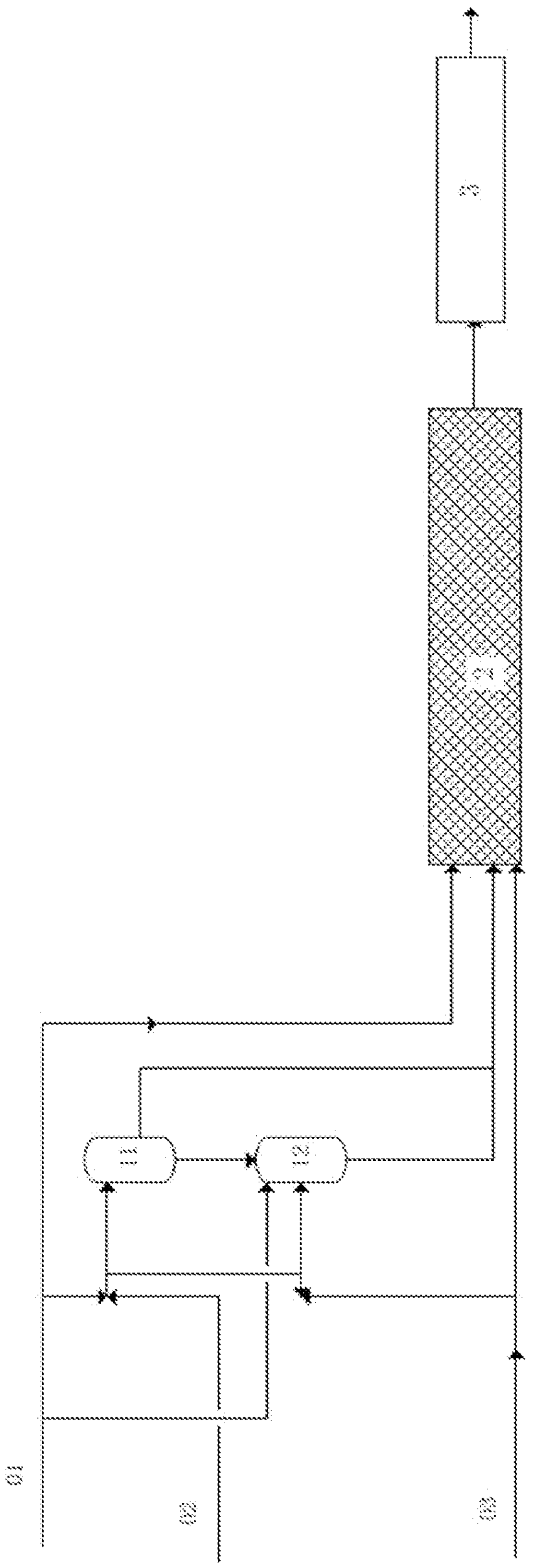
FIG. 1 is a schematic diagram of the apparatus of the present invention.

1: Input unit
2: Microchannel reactor
3: Post-treatment unit
01: $BF_3$ catalyst inlet
02: Auxiliary feed inlet
03: Olefin raw material inlet
001: Discharge pipe
002: Feed pipe
003: Shell
004: First heat exchange medium inlet
005: First heat exchange medium outlet
006: Second heat exchange medium inlet
007: Second heat exchange medium outlet
008: Mixing zone
009: Reaction zone
010: Reaction channel
011: Second mixing member
012: Second heat exchange cavity
013: First heat exchange cavity
014: Mixing channel
015: First mixing member
016: Fluid distributor
017: Fluid distribution pipe
018: Discharge pipe
019: First partition plate
020: Transition zone
021: Stabilization channel
022: Diffusion channel
023: Feeding zone
024: Collection zone
025: Second partition plate
0001: Main flow passage
0002: Branch flow passage
0003: Collection cavity
0004: Base strip
0005: Tooth element

DETAILED DESCRIPTION

The present invention will be further described below through examples and in conjunction with the accompanying drawings.

FIG. 1 is a schematic diagram of the apparatus for preparing polyalpha-olefins of the present invention, the apparatus comprises an input unit 1, a microchannel reactor 2, and a post-treatment unit 3 that are successively connected, the input unit 1 comprises a mixer 11 for mixing the $BF_3$ catalyst and the auxiliary feed, a mixer 12 for mixing a mixture of the $BF_3$ catalyst and the auxiliary feed and the olefin raw material, pipelines for individually inputting the $BF_3$ catalyst and the olefin raw material, one branch of the mixer 11 can be communicated with the mixer 12, and the other branch of the mixer 11 can be communicated with the microchannel reactor 2, and the mixer 12 is communicated with the mixer 12.

Figure 2:
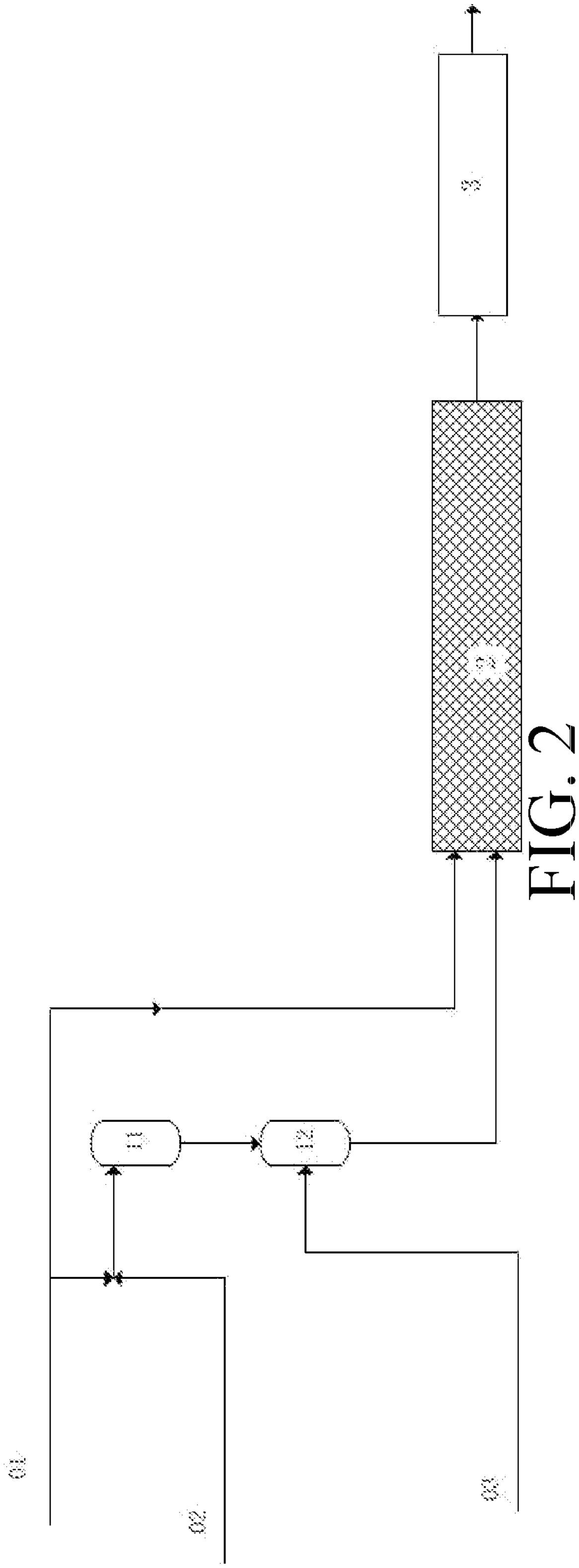
FIG. 2 is a schematic diagram of the apparatus of the present invention.

FIG. 2 is a schematic diagram of the apparatus for preparing polyalpha-olefins of the present invention, the apparatus comprises an input unit 1, a microchannel reactor 2, and a post-treatment unit 3 that are successively connected, the input unit 1 comprises a mixer 11 for mixing the $BF_3$ catalyst and the auxiliary feed, a mixer 12 for mixing a mixture of the $BF_3$ catalyst and the auxiliary feed and the olefin raw material, a pipeline for individually inputting the $BF_3$ catalyst, the mixer 11 is communicated with the mixer 12, and the mixer 12 is communicated with the microchannel reactor 2.

Figure 3:
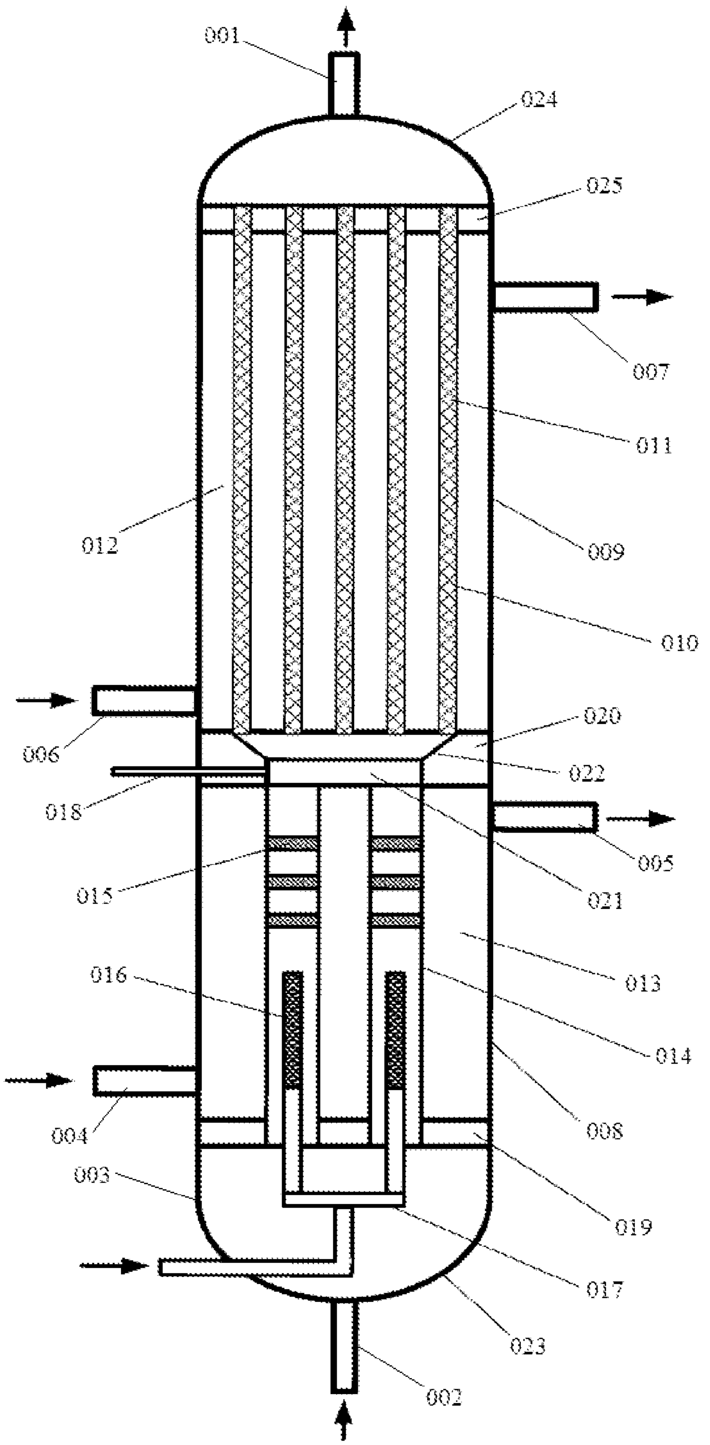
FIG. 3 is a schematic diagram of the preferred microchannel reactor of the present invention.

FIG. 3 is a schematic diagram of the preferred microchannel reactor of the present invention, comprising:

- a shell 003; a feeding zone 023, a mixing zone 008, a reaction zone 009, and a collection zone 024 are successively arranged and communicated along a first direction in the shell 003, wherein the shell 003 is provided with a feed pipe 002 communicated with the feeding zone 023 and a discharge pipe 001 communicated with the collection zone 024, and the mixing zone 008 is provided with a mixing channel 014 extending along the first direction;
- a fluid distribution pipe 017, the fluid distribution pipe 017 is extended from the exterior of the shell 003 into the mixing channel 014, the fluid distribution pipe 017 is connected with a fluid distributor 016 at an end of the mixing channel 014.

The shell 003 is the main container for accommodating the reactant and the product, and the feeding zone 023, the mixing zone 008, the reaction zone 009 and the collection zone 024 are different zones of the inner space of the shell 003 (all of which can store the stream), these zones are arranged in a straight line so that the reactant (and the product) advances in a straight line. In the present invention, the flow direction of the stream is referred to as the first direction. Preferably, as shown in FIG. 3, the shell 003 is positioned such that the first direction is the elevation direction, and the feeding zone 023, the mixing zone 008, the reaction zone 009 and the collection zone 024 are arranged in a bottom-to-top direction.

A first group of the reaction stream (the mixed stream from the input unit 1, there can be two or more feed pipes 002, the number of which corresponds to the number of the pipelines from the input unit 1, except for the pipeline for individually feeding the $BF_3$ catalyst) can be supplied into the feeding zone 023 through the feed pipe 002 on the shell 003, and the feeding zone 023 has a relatively large cavity and can act as storing the first group of the reaction stream, the first group of the reaction stream in the feeding zone 023 can enter the adjacent mixing zone 008, that is, the mixing channel 014. The fluid distribution pipe 017 is connected to the pipeline for individually feeding the $BF_3$ catalyst in the input unit 1, hence the input of a second group of the reaction stream (the individually fed $BF_3$ catalyst) can be provided to the mixing channel 014 through the fluid distribution pipe 017, so as to allow mixing the first group of the reaction stream and the second group of the reaction stream each other in the mixing channel 014 of the mixing zone 008. Among others, the outlet end of the fluid distribution pipe 017 is provided with a fluid distributor 016. The fluid distributor 016 can form the second group of the reaction stream into smaller droplets or bubbles, so that the second group of the reaction stream can be more uniformly distributed to the first group of the reaction stream in the mixing channel 014. Among others, the mixing structure in the mixing channel 014 is more suitable for mixing the liquid-phase stream and the gas-phase stream.

The first group of the reaction stream is a liquid-phase stream, and the second group of the reaction stream is a gas-phase stream. The gas-phase stream can be formed into dispersed micro-bubbles through the fluid distributor 016 to increase the contact area with the liquid-phase stream, and at the same time, also can impact the liquid-phase stream to a greater extent, thereby improving the uniformity of mixing the two.

In addition, as shown in FIG. 3, the mixing channel 014 is a cavity extending along the first direction, that is, the mixing channel 014 has a substantially tubular structure, thereby allowing the stream therein to flow along the first direction to form a stable plug flow.

The preferred microchannel reactor provided by the present invention, by designing the structure of the mixing channel and the mixing mode therein, can realize continuous and efficient mixing of the reaction stream and at the same time can maintain the reaction fluid to flow in a plug flow-like manner, ensure the consistency of the residence time of the reaction fluid as much as possible, and avoid the undesirable product selectivity due to residence time distribution.

More specifically, the fluid distributor 016 is at least one selected from powder sintered body with micropores, mesoporous foam material, wire mesh, tube with microslits or micropores. The powder sintered body with micropores can be obtained by sintering the powder into a structure with micropores through a powder metallurgy process, the hollow/mesoporous foam material is a hollow microchannel with network skeletons, and the wire mesh is a network structure with micropores, and the tube is provided with microslits or microholes, all of which can disperse the fluid from the fluid distributor tube 017 into smaller bubbles or droplets.

Preferably, the fluid distributor 016 is a cylindrical powder sintered body with micropores, and the mixing channel 014 has a circular cross-section. The fluid distributor 016 may be a structure having the substantially same outer diameter as the fluid distribution pipe 017, the cross-sectional shape of the fluid distributor 016 substantially corresponds to the cross-sectional shape of the mixing channel 014, and the fluid distributor 016 can be arranged coaxially with the mixing channel 014 so as to allow the fluid stream dispersed by the fluid distributor 016 to be more uniformly mixed with the stream in the mixing channel 014, and form a stable and uniform plug flow to avoid the inconsistency in the residence time of the stream.

Among others, the fluid distributor 016 has a cross-sectional area of 0.01 $cm^2$–200 $cm^2$, and a length of 1 mm-2000 mm. The mixing channel 014 has a cross-sectional area of 0.05 $cm^2$–400 $cm^2$, and a length of 50 mm-5000 mm. The length and the cross-sectional area of the mixing channel 014 are both greater than the length and the cross-sectional area of the fluid distributor 016. In addition, the mixing zone 008 is provided with 2-100 (preferably 2-50, more preferably 2-10) mixing channels 014, the fluid distribution pipe 017 includes a main pipe extending from the exterior of the shell 003 into the feeding zone 023 and branch pipes extending from the feeding zone 023 into each mixing channel 014 with fluid distributors 016 connected to branch pipe ends. A plurality of mixing channels 014 are respectively communicated with the feeding zone 023, and the first group of the reaction stream is divided into a plurality of parts in the mixing channels, which play the role of dispersing the first group of the reaction stream, and allow the first group of the reaction stream to form the stable, uniform plug flow. The fluid distribution pipe 017 includes a main pipe and branch pipes, wherein the main pipe is connected to the pipeline for independently feeding the $BF_3$ catalyst in the input unit 1, and extends from the position of the shell 003 corresponding to the feeding zone 023 into the feeding zone 023, and the branch pipes extend from the feeding zone 023 into the mixing channels 014. That is, the fluid distribution pipe 017 extends from the feeding zone 023 into the mixing channels 014. The mixing zone 008 and the feeding zone 023 can be partitioned by a first partition plate 019. The first partition plate 019 is provided with a plurality of through holes, and each mixing channel 014 is aligned with each through hole, so that the mixing zone 008 is communicated with the feeding zone 023.

In addition, in the mixing channel 014, a first mixing member 015 is disposed downstream of the fluid distributor 016. In the mixing channel 014, the downstream of the fluid distributor 016 refers to the downstream of the fluid flow direction (i.e., the downstream of the fluid distributor 016 in the first direction), that is, the position closer to the reaction zone 009 than the fluid distributor 016. Through the first mixing member 015, the fluid can be further mixed to improve the mixing uniformity of the two groups of streams.

Figure 4:
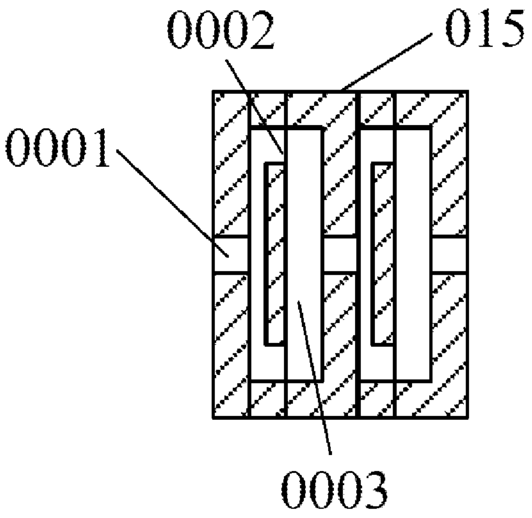
FIG. 4 is a sectional view of the first mixing member according to the present invention.

Specifically, the first mixing member 015 is provided with a main flow portion and a branch flow portion that are alternately arranged and communicated along the first direction. The main flow portion is provided with a single main flow passage 0001, and the branch flow portion is provided with a plurality of branch flow passages 0002. As shown in FIG. 4, one or more main flow portions/branch flow portions may be provided respectively and arranged alternately, wherein only a single main flow passage 0001 is arranged in the main flow portion, and a plurality of branch flow passages 0002 are arranged in the branch flow portion. The fluid converges in the main flow passage 0001 and disperses in the branch flow passages 0002 of each branch flow portion. Through such a converging-dispersing process, the degree of turbulence can be fully increased and the mixing uniformity of the fluid can be improved.

Further, in the first mixing member 015, the collection cavity 0003 that is communicated with a plurality of branch flow passages 0002 is disposed downstream of the branch flow portion 0002. As shown in FIG. 4, the volume (especially the cross-sectional area) of the collection cavity 0003 is larger than the volume (especially the cross-sectional area) of the main flow passage 0001, and the collection cavity 0003 can converge a plurality of upstream branch flow passages 0002 together, and it is communicated with the next main flow passage 0001 or the next stage of the reaction zone 009 or the transition zone 020.

As shown in FIG. 4, the first mixing member 015 according to an embodiment of the present invention is shown, which is formed by splicing a plurality of plate members (the number can be 2-100, preferably 2-50, more preferably 10-30) (the thickness is about 0.2 mm-10 mm) arranged along the first direction, and the structures such as holes and cavities that correspond to the main flow passage 0001, the branch flow passage 0002 and the collection cavity 0003 are formed on each plate member, which is convenient for processing and manufacturing.

In addition, the mixing zone 008 comprises a first heat exchange cavity disposed in the shell 003, the mixing channel 014 is disposed in the first heat exchange cavity 013, the shell 003 is provided with a first heat exchange medium inlet 004 and a first heat exchange medium outlet 005 that are communicated with the first heat exchange cavity 013. In the mixing zone 008, the mixing channel 014 and the first heat exchange cavity 013 are isolated from each other and not communicated with each other, but the heat conduction can be achieved between each other, and pipe fittings with good thermal conductivity can be used in the mixing channel 014. By supplying the heat exchange medium to the first heat exchange medium inlet 004 and discharging the heat exchange medium through the first heat exchange medium outlet 005, a circulating flow of the heat exchange medium can be formed in the first heat exchange cavity 013 to realize the heat exchange with the mixing channel 014 and the fluid therein, that is, to realize the heat dissipation of the mixing channel 014 and the fluid therein, ensure that the heat generated by the mixing and dissolving of the fluid in the mixing channel 014 is dissipated in time, so that the fluid therein is in a suitable temperature range.

Among others, the volumetric ratio of the first heat exchange cavity 013 to the mixing channel 014 is 2-50, preferably, the volumetric ratio of the first heat exchange cavity 013 to the mixing channel 014 is 5-30. The volume of the first heat exchange cavity 013 is larger than the volume of the mixing channel 014 so that the heat generated by the mixing and dissolving of the first group of the reaction stream and the second group of the reaction stream is conducted out in time.

In addition, a transition zone 020 is provided between the mixing zone 008 and the reaction zone 009, the transition zone 020 is provided with a stabilization channel 021 with constant cross-section and a diffusion channel 022 with gradually enlarged cross-section arranged and communicated along the first direction, the stabilization channel 021 is communicated with the mixing channel 014, the diffusion channel 022 is communicated with the reaction zone 009. The transition zone 020 can converge the mixed fluids from a plurality of the mixing channels 014 together in the stabilization channel 021 to achieve another uniform mixing, and then deliver the mixed fluids into the reaction zone 009 via the diffusion channel 022. Among others, the transition area 020 is provided with a stabilization channel 021 and a diffusion channel 022, the stabilization channel 021 mainly realizes the converging and mixing of the fluids, and the diffusion channel 022 is in a bell mouth shape, which can diffuse, for example, can disperse the mixed fluid into a plurality of the reaction channel 010 as described hereinafter. The two ends of the transition zone 020 are respectively provided with partition plates with through holes, so as to be respectively isolated from the mixing zone 008 (mainly the first heat exchange cavity 013) and the reaction zone 009 (mainly the second heat exchange cavity 012), and communicated with each mixing channel 014 and each of reaction channels 010 in parallel through each through hole on each partition plate, and the diffusion channel 022 and the stabilization channel 021 can be pipe fittings provided between two partition plates.

In addition, the stabilization channel 021 can be connected to a discharge pipe 018 extending to the exterior of the shell 003. As mentioned above, the stabilization channel 021 has the function of converging and mixing, and the discharge pipe 018 can discharge the bubbles and streams accumulated in the stabilization channel 021 to avoid the influence of the bubble accumulation on the mixing uniformity, and the blockage of streams. A valve can be set on the discharge pipe 018, and the valve can be opened when it is necessary to discharge bubbles or streams.

In addition, the diffusion channel 022 is provided with a diffusion plate with meshes or slits. The diffusion plate may be substantially perpendicular to the first direction. The fluid in the diffusion channel 022 can flow through meshes or slits on the diffusion plate, so that the fluid is dispersed and the uniformity of the mixed fluid is enhanced.

Specifically, the reaction zone 009 is provided with a plurality of parallel reaction channels 010 extending along the first direction and communicated with the mixing channel 014 via the stabilization channel 021 and the diffusion channel 022. The reaction channel 010 provides a reaction space for the mixed fluid, and bears the mixed fluid to flow to the next stage of the collection area 024 along the first direction, so that the mixed fluid reacts while forming a stable plug flow in the reaction channel 010 to avoid undesired products due to inconsistent residence time distributions. As stated above, a transition zone 020 may be provided between the reaction zone 009 and the mixing zone 008, and a plurality of reaction channels 010 may be communicated with the diffusion channel 022, so that the mixed fluid in the diffusion channel 022 is uniformly dispersed into a plurality of the reaction channels 010. The number of reaction channels is, for example, 2-10000 channels, preferably 2-5000 channels, and more preferably 2-500 channels. The reaction channel 010 can have a cross-section in at least one of circular, rectangular and triangular shapes.

In addition, the reaction channel 010 is provided with a second mixing member 011, and the second mixing member 011 includes a base strip 0004 extending along the first direction and a tooth element 0005 connected to the base strip 0004 and extended transversely to the base strip 0004. In the second mixing member 011, the base strip 0004 provides a support for a plurality of tooth elements 0005, so that the tooth elements 0005 can be stably held in the reaction channel 010, and the tooth elements 0005 extend approximately transversely to the reaction channel 010, which can improve the turbulence degree of the fluid in the reaction channel 010, thereby improving the mixing uniformity between the reaction streams.

Among others, the tooth elements 0005 are in one of triangular, arcual, wavy, and spiral shapes.

Tooth elements 0005 can be in various shapes, as long as they extend transversely to the reaction channel 010 and can achieve the effect of increasing the turbulence degree of the fluid. Preferably, the tooth element 0005 is of triangular shape, and on one side of the triangle adjacent to the base strip 0004, one corner is connected to the base strip 0004, and the other corner is 0.01 mm-20 mm away from the base strip 0004. The tooth elements 0005 may be triangular plate members and are connected to the base strip 0004 only with one corner.

Preferably, each reaction channel 010 is provided with a plurality of the second mixing members 011 (the number can be 2-100, preferably 2-50, more preferably 10-30), which are stacked at intervals, and a plurality of the second mixing members 011 are stacked at intervals, and correspondingly the tooth elements 0005 are also stacked at intervals, and the tooth elements 0005 of different second mixing members 011 are arranged staggeredly, so that different second mixing members 011 are arranged more irregularly and the turbulence degree of the fluid in the reaction channel 010 can be better improved.

Preferably, the cross-section of the reaction channel 010 is rectangular, and the tooth elements 0005 extend between a set of opposite sides of the rectangle. Specifically, the reaction channel 010 includes four side walls, namely two sets of opposite parallel side walls, the base strip 0004 is disposed at one side wall of the reaction channel 010, and the tooth elements 0005 extend toward the other opposite side wall, a plurality of second mixing elements 011 can better accommodate the inner cavity structure having a square pillar shape of the reaction channel 010.

Specifically, the reaction channel 010 has a cross-sectional area of 1 $mm^2$-150 $mm^2$, and a length of 50 mm-5000 mm, the minimum distance between the reaction channels 010 is 1 mm-50 mm, and the second mixing member 011 has a thickness of 0.1 mm-3 mm, and the spacing between adjacent tooth elements 0005 is 1 mm-50 mm.

Preferably, the reaction channel 010 has a length of 100 mm-3000 mm, the minimum spacing between the reaction channels 010 is 3 mm-30 mm, the second mixing member 011 has a thickness of 0.2 mm-2 mm, the spacing between adjacent tooth elements 0005 is 1.5 mm-20 mm. The minimum spacing of the reaction channels 010 reflects the density of the reaction channels 010 in the reaction zone 009. Preferably, in the second mixing member 011, the tooth element 0005 is a plate member that can be coplanar with the base strip 0004, and the thickness of the second mixing member 011 is approximately the thickness of the tooth element 0005.

In addition, the reaction zone 009 can be provided with a second heat exchange cavity 012 disposed in the shell 003, the reaction channel 010 is disposed in the second heat exchange cavity 012, the shell 003 is provided with a second heat transfer medium inlet 006 and a second heat transfer medium outlet 007 that are communicated with the second heat exchange cavity 012. The second heat exchange cavity 012 may be mainly formed by the shell 003, and at two ends are respectively the second partition plate 025 between the reaction zone 009 and the collection zone 024 and the partition plate between the reaction zone 009 and the transition zone 020. Through the second heat exchange medium inlet 006 and the second heat exchange medium outlet 007, the heat exchange medium can be introduced into the second heat exchange cavity 012 to realize the heat exchange treatment of the reaction channel 010, so as to ensure that the fluid in the reaction channel 010 is reacted in an appropriate temperature range, and avoid the production of undesired products.

In addition, the first heat exchange cavity 013 and the second heat exchange cavity 012 may be connected in series with each other and arranged in a single heat exchange circulation flow path, or may also be arranged in parallel in a single heat exchange circulation flow path, or may be arranged in two different heat exchange circulation flow paths respectively.

Among others, the volumetric ratio of the second heat exchange cavity 012 to the reaction channel 010 is 2-50, preferably, the volumetric ratio of the second heat exchange cavity 012 to the reaction channel 010 is 5-30. The volume of the second heat exchange cavity 012 is larger than the volume of the reaction channel 010, so that the heat in the reaction channel 010 can be discharged in time to ensure that the reaction channel 010 is at a suitable temperature.

The preferred microchannel reactor of the present invention can be used to synthesize the polyalpha-olefin synthetic oil, the feed pipe 002 can be used to input the liquid-phase stream (continuous phase) (the mixed stream from the input unit 1), and the fluid distribution pipe 017 can be used to input the gas phase stream (dispersion phase) (the individually fed $BF_3$ catalyst from the input unit 1). The liquid-phase stream is used as the continuous phase to enter the feeding zone 023 of the microchannel reactor from the feed pipe 002, and the gas phase stream is used as the dispersed phase to enter the mixing channel 014 of the reactor from the fluid distribution pipe 017, and dissolved in the continuous phase through the fluid distributor 016. The mixed fluid that has completed the reaction in the reaction channel 010 enters the collection area 024, and finally is discharged from the discharge pipe 001.

In the embodiments of the present invention, the preferred structural components or parameters are employed without repeated recitation when using the preferred microchannel reactor, unless otherwise specified.

Figure 7:
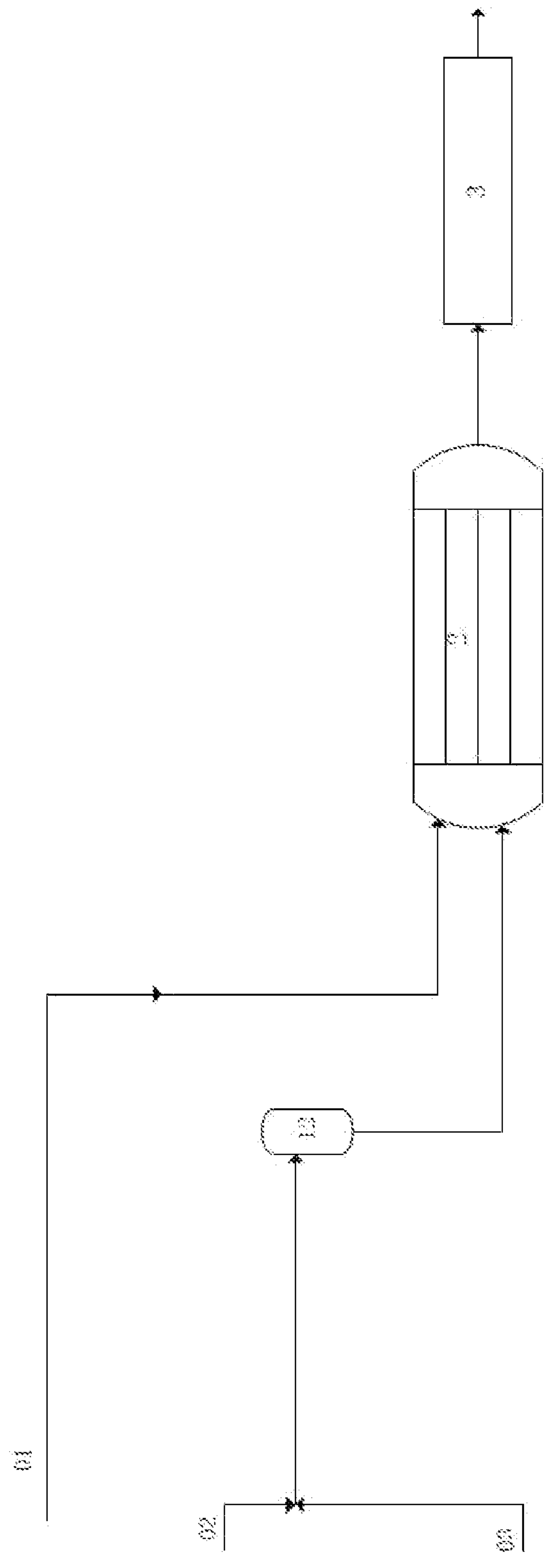
FIG. 7 is a schematic diagram of the comparative apparatus of the present invention.

FIG. 7 is a schematic diagram for a comparative apparatus of the present invention, wherein the apparatus comprises an input unit 1, a tubular reactor 2, and a post-treatment unit 3 that are successively connected, the input unit 1 comprises a mixer 12 for the auxiliary feed and the olefin raw material, and a pipeline for individually feeding the $BF_3$ catalyst.

Example 1

In this example, the mass ratio of the $BF_3$ directly fed to the microchannel reactor to the $BF_3$ fed to the mixer to participate in the mixing was 60:40, the stream obtained by mixing a part of the $BF_3$ catalyst and the whole auxiliary feed was passed into the microchannel reactor, and each of the residue of the $BF_3$ catalyst and the whole olefin raw material was individually passed into the microchannel reactor (the above-mentioned configuration mode 2 and feeding mode 2 according to the present invention).

In the apparatus, the structure and parameter of the mixer was as follows: The mixer had a cylindrical structure with an outer diameter of 10 cm and an inner diameter of 6 cm. The mixer had two feed inlets at the lower end and one discharge outlet at the uppermost end. The mixer was equipped with a filler layer, and the filler was ceramic balls. The mixer had a heat exchange layer having a temperature of 0-100° C.

Figure 5:
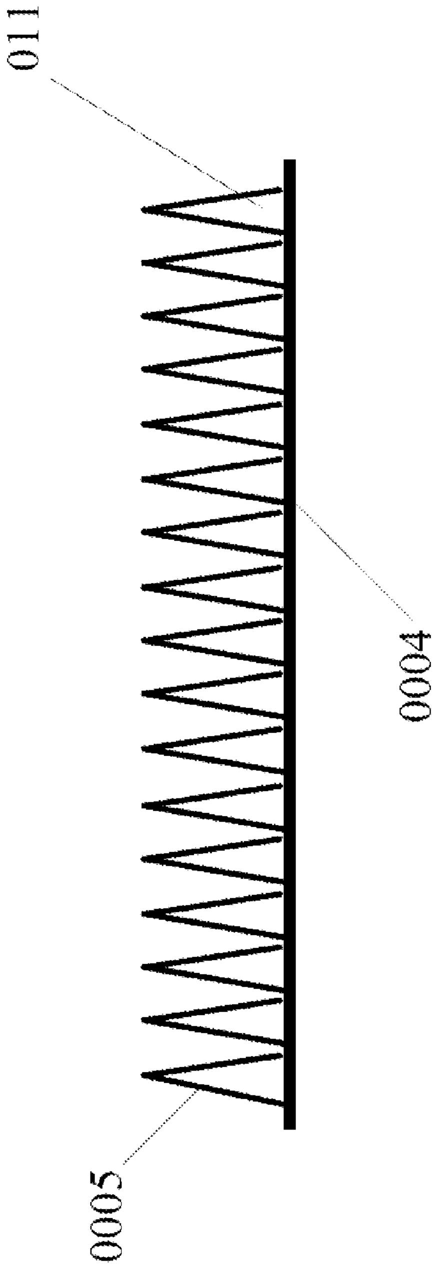
FIG. 5 is a structural representation of the second mixing member according to the present invention.
Figure 6:
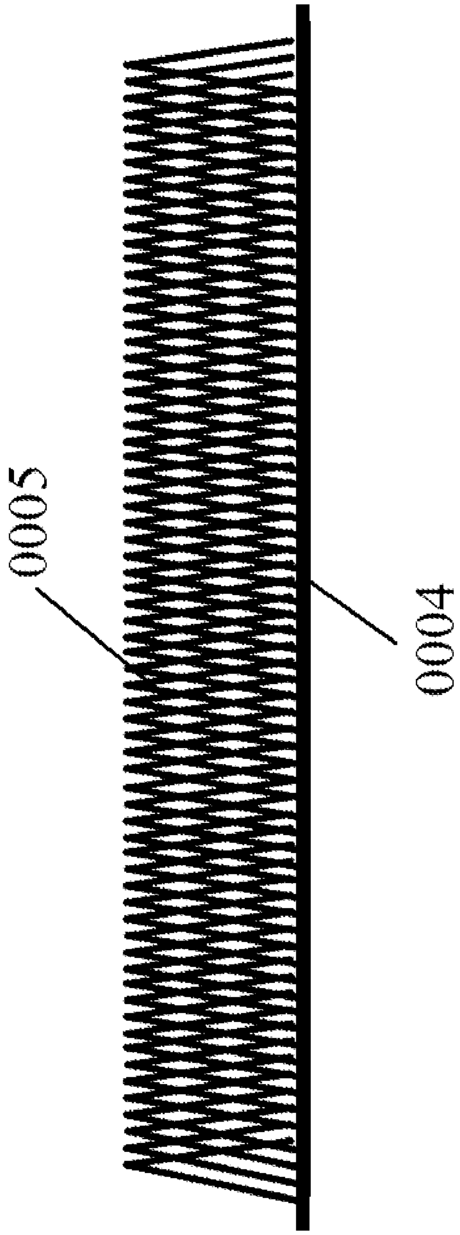
FIG. 6 is a structural representation for superimposing a plurality of the second mixing members according to the present invention.

In the apparatus, the used microchannel reactor was the preferred microchannel reactor of the present invention as described above containing 5 reaction channels 010 in parallel, each reaction channel 010 had a rectangular cross-section with a cross-sectional area of 20 $mm^2$, and the reaction channel 010 had a length of 2000 mm. The second mixing member 011 in the reaction channel 010 had triangular tooth elements 0005, and the spacing between adjacent tooth elements 0005 was 5 mm. In the reaction channel 010, a total of four layers of superimposed second mixing members 011 as shown in FIG. 5 were arranged. The reactor contained two mixing channels 014, which had a cross-sectional area of 10 $cm^2$ and a length of 800 mm. The fluid distributor 016 was a metal powder sintered body having an average pore size of 5 microns, a cross-sectional area of 8.5 $cm^2$ and a length of 150 mm. Three first mixing members 015 were provided in each mixing channel 014.

In the apparatus, the post-treatment unit 3 was a solid adsorption device, and its structure and parameter was as follows: open type, an effective volume of 10 L, operating at normal temperature, feeding at the lower end, discharging at the upper end, and filling the tank with potassium oxide.

The $BF_3$ gas at a flow rate of 126 L/h and n-butanol at 0.6 L/h were mixed in a mixer. Into the microchannel reactor 2, the stream in the mixer at a flow rate of 1.2 L/h, the $BF_3$ gas at a flow rate of 189 L/h that was additionally independently fed, and decene at a flow rate of 60 L/h were each individually fed. The polymerization reaction occurred, the reaction temperature was 20° C., and the pressure was 5 MPa. The stream obtained after the polymerization reaction entered the alkaline washing and water washing devices for the post-treatment. The polyolefin product was obtained after the catalyst was removed. After the system run stably, a sample was taken and measured by the gas chromatography for the content of each component in the product. The test results were as shown in Table 1.

TABLE 1

| Olefin composition distribution | Content |
|---|---|
| Monomer, % | 1.2 |
| Dimer, % | 3.1 |
| Trimer, % | 43.1 |
| Tetramer, % | 32.1 |
| Pentamer, % | 17.0 |
| ≥Hexamer, % | 3.5 |
| Conversion, % | 98.8 |

Example 2

In this example, the mass ratio of the $BF_3$ directly fed to the microchannel reactor to the $BF_3$ fed to the mixer to participate in the mixing was 60:40, the stream obtained by mixing a part of the $BF_3$ catalyst and a part of the auxiliary feed was passed into the microchannel reactor, and each of the residue of the $BF_3$ catalyst, the residue of the auxiliary feed and the whole olefin raw material was individually passed into the microchannel reactor (the above-mentioned configuration mode 3 and feeding mode 3 according to the present invention).

The mixer and the microchannel reactor had the same structures as those of Example 1.

In the apparatus, the post-treatment unit 3 was a solid adsorption device, and its structure and parameter was as follows: open type, an effective volume of 10 L, operating at normal temperature, feeding at the lower end, discharging at the upper end, and filling the tank with potassium oxide.

The $BF_3$ gas at a flow rate of 126 L/h and n-butanol at 0.3 L/h were mixed in a mixer. Into the microchannel reactor 2, the stream in the mixer at a flow rate of 1.2 L/h, the $BF_3$ gas at a flow rate of 189 L/h that was additionally independently fed, n-butanol at 0.3 L/h, and decene at a flow rate of 60 L/h were each individually fed. The polymerization reaction occurred, the reaction temperature was 20° C., and the pressure was 5 MPa. The stream obtained after the polymerization reaction entered the alkaline washing and water washing devices for the post-treatment. The polyolefin product was obtained after the catalyst was removed. After the system run stably, a sample was taken and measured by the gas chromatography for the content of each component in the product. The test results were as shown in Table 2.

TABLE 2

| Olefin composition distribution | Content |
|---|---|
| Monomer, % | 1.1 |
| Dimer, % | 3.5 |
| Trimer, % | 43.2 |
| Tetramer, % | 31.7 |
| Pentamer, % | 17.1 |
| ≥Hexamer, % | 3.4 |
| Conversion, % | 98.9 |

Example 3

In this example, the mass ratio of the $BF_3$ directly fed to the microchannel reactor to the $BF_3$ fed to the mixer to participate in the mixing was 60:40, the stream obtained by mixing a part of the $BF_3$ catalyst, a part of the auxiliary feed and the whole olefin raw material was passed into the microchannel reactor, and each of the residue of the $BF_3$ catalyst, and the residue of the auxiliary feed was individually passed into the microchannel reactor (the above-mentioned configuration mode 4 and feeding mode 4 according to the present invention).

The polymerization of the olefin raw material was carried out by using the apparatus for preparing polyalpha-olefins shown in FIG. 1.

In the apparatus, the structure and parameter of the mixer 11 was as follows: the mixer had a cylindrical structure with an outer diameter of 10 cm and an inner diameter of 6 cm. The mixer had two feed inlets at the lower end and one discharge outlet at the uppermost end. The mixer was equipped with a filler layer, and the filler was ceramic balls. The mixer had a heat exchange layer having a temperature of 0-100° C.

In the apparatus, the structure and parameter of the mixer 12 was as follows: the mixer had a cylindrical structure with an outer diameter of 10 cm and an inner diameter of 6 cm. The mixer had two feed inlets at the lower end and one discharge outlet at the uppermost end. The mixer was equipped with a filler layer, and the filler was a regular filler. The mixer had a heat exchange layer having a temperature of 0-50° C.

The microchannel reactor had the same structure as that of Example 1.

In the apparatus, the post-treatment unit 3 was a solid adsorption device, and its structure and parameter was as follows: open type, an effective volume of 10 L, operating at normal temperature, feeding at the lower end, discharging at the upper end, and filling the tank with potassium oxide. The $BF_3$ gas at a flow rate of 126 L/h and n-butanol at 0.3 L/h were mixed in a mixer 11, and then the mixture and decene at a flow rate of 60 L/h were mixed in a mixer 12. Into the microchannel reactor 2, the stream in the mixer 12 at a flow rate of 60.6 L/h, the $BF_3$ gas at a flow rate of 189 L/h that was additionally independently fed, and n-butanol at 0.3 L/h were each individually fed. The polymerization reaction occurred, the reaction temperature was 20° C., and the pressure was 5 MPa. The stream obtained after the polymerization reaction entered the alkaline washing and water washing devices for the post-treatment. The polyolefin product was obtained after the catalyst was removed. After the system run stably, a sample was taken and measured by the gas chromatography for the content of each component in the product. The test results were as shown in Table 3.

TABLE 3

| Olefin composition distribution | Content |
|---|---|
| Monomer, % | 0.9 |
| Dimer, % | 2.9 |
| Trimer, % | 43.2 |
| Tetramer, % | 32.3 |
| Pentamer, % | 17.0 |
| ≥Hexamer, % | 3.7 |
| Conversion, % | 99.1 |

Example 4

In this example, the mass ratio of the $BF_3$ directly fed to the microchannel reactor to the $BF_3$ fed to the mixer to participate in the mixing was 60:40, the stream obtained by mixing a part of the $BF_3$ catalyst, the whole auxiliary feed and a part of the olefin raw material was passed into the microchannel reactor, and each of the residue of the $BF_3$ catalyst, and the residue of the olefin raw material was individually passed into the microchannel reactor (the above-mentioned configuration mode 5 and feeding mode 5 according to the present invention).

The polymerization of the olefin raw material was carried out by using the apparatus for preparing polyalpha-olefins shown in FIG. 1.

The mixer and the microchannel reactor had the same structures as those of Example 3.

In the apparatus, the post-treatment unit 3 was a solid adsorption device, and its structure and parameter was as follows: open type, an effective volume of 10 L, operating at normal temperature, feeding at the lower end, discharging at the upper end, and filling the tank with potassium oxide.

The $BF_3$ gas at a flow rate of 126 L/h and n-butanol at 0.6 L/h were mixed in a mixer 11, and then the mixture and decene at a flow rate of 30 L/h were mixed in a mixer 12. Into the microchannel reactor 2, the stream in the mixer 12 at a flow rate of 30.6 L/h, the $BF_3$ gas at a flow rate of 189 L/h that was additionally independently fed, and decene at 0.3 L/h were each individually fed. The polymerization reaction occurred, the reaction temperature was 20° C., and the pressure was 5 MPa.

The stream obtained after the polymerization reaction entered the alkaline washing and water washing devices for the post-treatment. The polyolefin product was obtained after the catalyst was removed. After the system run stably, a sample was taken and measured by the gas chromatography for the content of each component in the product. The test results were as shown in Table 4.

TABLE 4

| Olefin composition distribution | Content |
|---|---|
| Monomer, % | 1.7 |
| Dimer, % | 3.7 |
| Trimer, % | 42.6 |
| Tetramer, % | 32.1 |
| Pentamer, % | 16.6 |
| ≥Hexamer, % | 3.3 |
| Conversion, % | 98.3 |

Example 5

In this example, the mass ratio of the $BF_3$ directly fed to the microchannel reactor to the $BF_3$ fed to the mixer to participate in the mixing was 60:40, the stream obtained by mixing a part of the $BF_3$ catalyst, the whole auxiliary feed, and the whole olefin raw material was passed into the microchannel reactor, and the residue of the $BF_3$ catalyst was individually passed into the microchannel reactor (the above-mentioned configuration mode 6 and feeding mode 6 according to the present invention).

The mixer and the microchannel reactor had the same structures as those of Example 1, except that the used mixer had three feed inlets.

In the apparatus, the post-treatment unit 3 was a solid adsorption device, and its structure and parameter was as follows: open type, an effective volume of 10 L, operating at normal temperature, feeding at the lower end, discharging at the upper end, and filling the tank with potassium oxide.

The $BF_3$ gas at a flow rate of 126 L/h, n-butanol at 0.6 L/h and decene at a flow rate of 60 L/h were passed into the mixer to perform the mixing. Into the microchannel reactor 2, the stream in the mixer at a flow rate of 61.2 L/h and the $BF_3$ gas at a flow rate of 189 L/h that was additionally independently fed were each individually fed. The polymerization reaction occurred, the reaction temperature was 20° C., and the pressure was 5 MPa. The stream obtained after the polymerization reaction entered the alkaline washing and water washing devices for the post-treatment. The polyolefin product was obtained after the catalyst was removed. After the system run stably, a sample was taken and measured by the gas chromatography for the content of each component in the product. The test results were as shown in Table 5.

TABLE 5

| Olefin composition distribution | Content |
|---|---|
| Monomer, % | 0.7 |
| Dimer, % | 2.5 |
| Trimer, % | 43.3 |
| Tetramer, % | 32.4 |
| Pentamer, % | 17.2 |
| ≥Hexamer, % | 3.9 |
| Conversion, % | 99.3 |

Example 6

In this example, the mass ratio of the $BF_3$ directly fed to the microchannel reactor to the $BF_3$ fed to the mixer to participate in the mixing was 60:40. In the input unit, a part of the $BF_3$ catalyst and the whole auxiliary feed were subjected to a first mixing, then subjected to a second mixing with the whole olefin raw material, then the mixed stream was passed into the microchannel reactor, and the residue of the $BF_3$ catalyst was individually passed into the microchannel reactor (the above-mentioned configuration mode 6 and feeding mode 6 according to the present invention).

The polymerization of the olefin raw material was carried out by using the apparatus for preparing polyalpha-olefins shown in FIG. 2.

The mixer and the microchannel reactor had the same structures as those of Example 3.

In the apparatus, the post-treatment unit 3 was a solid adsorption device, and its structure and parameter was as follows: open type, an effective volume of 10 L, operating at normal temperature, feeding at the lower end, discharging at the upper end, and filling the tank with potassium oxide. The $BF_3$ gas at a flow rate of 126 L/h and n-butanol at 0.6 L/h were mixed in the mixer 11, and the mixed stream and decene at a flow rate of 60 L/h were passed into the mixer 12. Into the microchannel reactor 2, the stream in the mixer 12 at a flow rate of 61.2 L/h and the $BF_3$ gas at a flow rate of 189 L/h that was additionally independently fed were each individually fed. The polymerization reaction occurred, the reaction temperature was 20° C., and the pressure was 5 MPa. The stream obtained after the polymerization reaction entered the alkaline washing and water washing devices for the post-treatment. The polyolefin product was obtained after the catalyst was removed. After the system run stably, a sample was taken and measured by the gas chromatography for the content of each component in the product. The test results were as shown in Table 6.

TABLE 6

| Olefin composition distribution | Content |
|---|---|
| Monomer, % | 0.2 |
| Dimer, % | 1.9 |
| Trimer, % | 43.9 |
| Tetramer, % | 32.2 |
| Pentamer, % | 18.0 |
| ≥Hexamer, % | 3.8 |
| Conversion, % | 99.8 |

Example 7

In this example, the mass ratio of the $BF_3$ directly fed to the microchannel reactor to the $BF_3$ fed to the mixer to participate in the mixing was 50:50. In the input unit, a part of the $BF_3$ catalyst and the whole auxiliary feed were subjected to a first mixing, then subjected to a second mixing with the whole olefin raw material, then the mixed stream was passed into the microchannel reactor, and the residue of the $BF_3$ catalyst was individually passed into the microchannel reactor.

The polymerization of the olefin raw material was carried out by using the apparatus for preparing polyalpha-olefins shown in FIG. 2.

The mixer and the microchannel reactor had the same structures as those of Example 3.

In the apparatus, the post-treatment unit 3 was a solid adsorption device, and its structure and parameter was as follows: open type, an effective volume of 10 L, operating at normal temperature, feeding at the lower end, discharging at the upper end, and filling the tank with potassium oxide.

The $BF_3$ gas at a flow rate of 126 L/h and n-butanol at 0.6 L/h were mixed in the mixer 11, and the mixed stream and decene at a flow rate of 60 L/h were passed into the mixer 12. Into the microchannel reactor 2, the stream in the mixer 12 at a flow rate of 61.2 L/h and the $BF_3$ gas at a flow rate of 126 L/h that was additionally independently fed were each individually fed. The polymerization reaction occurred, the reaction temperature was 20° C., and the pressure was 5 MPa.

The stream obtained after the polymerization reaction entered the alkaline washing and water washing devices for the post-treatment. The polyolefin product was obtained after the catalyst was removed. After the system run stably, a sample was taken and measured by the gas chromatography for the content of each component in the product. The test results were as shown in Table 7.

TABLE 7

| Olefin composition distribution | Content |
|---|---|
| Monomer, % | 0.9 |
| Dimer, % | 2.2 |
| Trimer, % | 43.3 |
| Tetramer, % | 32.5 |
| Pentamer, % | 17.3 |
| ≥Hexamer, % | 3.8 |
| Conversion, % | 99.1 |

Comparative Example 1

The olefin polymerization was carried out by using the apparatus for preparing polyalpha-olefins shown in FIG. 2. In this example, the mass ratio of the $BF_3$ directly fed to the microchannel reactor to the $BF_3$ fed to the mixer to participate in the mixing was 60:40, a part of the $BF_3$ catalyst and the whole auxiliary feed were subjected to a first mixing, then subjected to a second mixing with the whole olefin raw material, then the mixed stream was passed into the microchannel reactor, and the residue of the $BF_3$ catalyst was individually passed into the microchannel reactor.

The mixer had the same structure as that of Example 3.

In the apparatus, the microchannel reactor 2 contained 5 reaction channels 010 in parallel, each reaction channel 010 had a rectangular cross-section with a cross-sectional area of 20 $mm^2$, and the reaction channel 010 had a length of 2000 mm. The second mixing member 011 in the reaction channel 010 had triangular tooth elements 0005, and the spacing between adjacent tooth elements 0005 was 5 mm. In the reaction channel 010, a total of four layers of superimposed second mixing members 011 as shown in FIG. 5 were arranged. Neither the mixing channel 014 nor the fluid distributor 016 was in the reactor.

In the apparatus, the post-treatment unit 3 was an adsorption device, and its structure and parameter was as follows: open type, an effective volume of 10 L, operating at normal temperature, feeding at the lower end, discharging at the upper end, and filling the adsorption device with calcium oxide. The $BF_3$ gas at a flow rate of 126 L/h and n-butanol at 0.6 L/h were mixed in the mixer 11, and the mixed stream and decene at a flow rate of 60 L/h were passed into the mixer 12. Into the microchannel reactor 2, the stream in the mixer 12 at a flow rate of 61.2 L/h and the $BF_3$ gas at a flow rate of 189 L/h that was additionally independently fed were each individually fed. The polymerization reaction occurred in the microchannel reactor 2, the reaction temperature was 20° C., and the pressure was 5 MPa. The stream obtained after the polymerization reaction entered the adsorption device, and the catalyst was removed by adsorption to produce a polyolefin product. A small amount of the sample was taken, and measured by the gas chromatography for the content of each component in the product. The test results were as shown in Table 8.

TABLE 8

| Olefin composition distribution | Content |
|---|---|
| Monomer, % | 19.4 |
| Dimer, % | 13.2 |
| Trimer, % | 23.9 |
| Tetramer, % | 23.4 |
| Pentamer, % | 14.5 |
| ≥Hexamer, % | 5.6 |
| Conversion, % | 80.6 |

Comparative Example 2

The polymerization reaction was carried out by using the apparatus for preparing polyalpha-olefins shown in FIG. 2. In this example, the mass ratio of the $BF_3$ directly fed to the microchannel reactor to the $BF_3$ fed to the mixer to participate in the mixing was 60:40, a part of the $BF_3$ catalyst and the whole auxiliary feed were subjected to a first mixing, then subjected to a second mixing with the whole olefin raw material, then the mixed stream was passed into the microchannel reactor, and the residue of the $BF_3$ catalyst was individually passed into the microchannel reactor.

The microchannel reactor had the same structure as that of Example 3.

In the apparatus, the microchannel reactor 2 contained 5 reaction channels 010 in parallel, each reaction channel 010 had a rectangular cross-section with a cross-sectional area of 20 $mm^2$, and the reaction channel 010 had a length of 2000 mm. The second mixing member 011 in the reaction channel 010 had triangular tooth elements 0005, and the spacing between adjacent tooth elements 0005 was 5 mm. In the reaction channel 010, a total of four layers of superimposed second mixing members 011 as shown in FIG. 5 were arranged. The reactor contained one mixing channel 014, which had a cross-sectional area of 10 $cm^2$ and a length of 800 mm. The fluid distributor 016 was a metal powder sintered body having an average pore size of 5 microns, a cross-sectional area of 8.5 $cm^2$ and a length of 150 mm. Three first mixing members 015 were provided in the mixing channel 014.

In the apparatus, The post-treatment unit 3 was a centrifugation device, and its structure and parameter was as follows: tubular type centrifuge, operating at normal temperature, and separation factor of 8000 G.

The $BF_3$ gas at a flow rate of 126 L/h and n-butanol at 0.6 L/h were mixed in the mixer 11, and the mixed stream and decene at a flow rate of 60 L/h were passed into the mixer 12. Into the microchannel reactor 2, the stream in the mixer 12 at a flow rate of 61.2 L/h and the $BF_3$ gas at a flow rate of 189 L/h that was additionally independently fed were each individually fed. The polymerization reaction occurred in the microchannel reactor 2, the reaction temperature was 20° C., and the pressure was 5 MPa. The stream obtained after the polymerization reaction entered a centrifugation device, centrifugally separated to remove the catalyst, water washed for three times to produce a polyolefin product. After the system run stably, a small amount of the sample was taken, and measured by the gas chromatography for the content of each component in the product. The test results were as shown in Table 9.

TABLE 9

| Olefin composition distribution | Content |
|---|---|
| Monomer, % | 15.5 |
| Dimer, % | 7.8 |
| Trimer, % | 32.5 |
| Tetramer, % | 26.8 |
| Pentamer, % | 13.2 |
| ≥Hexamer, % | 4.2 |
| Conversion, % | 84.5 |

Example 8

The polymerization of the olefin raw material was carried out by using the apparatus for preparing polyalpha-olefins shown in FIG. 2. In this example, the mass ratio of the $BF_3$ directly fed to the microchannel reactor to the $BF_3$ fed to the mixer to participate in the mixing was 60:40. In the input unit, a part of the $BF_3$ catalyst and the whole auxiliary feed were subjected to a first mixing, then subjected to a second mixing with the whole olefin raw material, then the mixed stream was passed into the microchannel reactor, and the residue of the $BF_3$ catalyst was individually passed into the microchannel reactor.

The mixer and the microchannel reactor had the same structures as those of Example 3.

In the apparatus, the microchannel reactor 2 contained 5 reaction channels 010 in parallel, each reaction channel 010 had a rectangular cross-section with a cross-sectional area of 20 $mm^2$, and the reaction channel 010 had a length of 2000 mm. The second mixing member 011 in the reaction channel 010 had triangular tooth elements 0005, and the spacing between adjacent tooth elements 0005 was 5 mm. In the reaction channel 010, a total of four layers of superimposed second mixing members 011 as shown in FIG. 5 were arranged. The reactor contained two mixing channels 014, which had a cross-sectional area of 10 $cm^2$ and a length of 800 mm. Three first mixing members 015 were provided in each mixing channel 014. The fluid distributor 016 was made of micro/mesoporous tube material, and the hollow microchannels constituting the network framework of the micro/mesoporous tube material had a cross-sectional area of 8.5 $cm^2$, an average pore diameter of 2 microns, and a length of 150 mm.

In the apparatus, the post-treatment unit 3 was a centrifugation device, and its structure and parameter was as follows: tubular type centrifuge, operating at normal temperature, and separation factor of 8000 G.

The $BF_3$ gas at a flow rate of 126 L/h and n-butanol at 0.6 L/h were mixed in the mixer 11, and the mixed stream and decene at a flow rate of 60 L/h were passed into the mixer 12. Into the microchannel reactor 2, the stream in the mixer 12 at a flow rate of 61.2 L/h and the $BF_3$ gas at a flow rate of 189 L/h that was additionally independently fed were each individually fed. The polymerization reaction occurred in the microchannel reactor 2, the reaction temperature was 20° C., and the pressure was 5 MPa. The stream obtained after the polymerization reaction entered a centrifugation device, centrifugally separated to remove the catalyst, water washed for three times to produce a polyolefin product. After the system run stably, a small amount of the sample was taken, and measured by the gas chromatography for the content of each component in the product. The test results were as shown in Table 10.

TABLE 10

| Olefin composition distribution | Content |
|---|---|
| Monomer, % | 0.6 |
| Dimer, % | 2.7 |
| Trimer, % | 42.6 |
| Tetramer, % | 31.7 |
| Pentamer, % | 18.3 |
| ≥Hexamer, % | 4.1 |
| Conversion, % | 99.4 |

Comparative Example 3

In this example, the structure and the parameter of the microchannel reactor 2 were identical to those of Example 1.

In the apparatus, the post-treatment unit 3 was an adsorption device, and its structure and parameter process was as follows: open type, an effective volume of 10 L, operating at normal temperature, feeding at the lower end, discharging at the upper end, and filling the adsorption device with calcium oxide.

Into the microchannel reactor 2 were each independently fed the $BF_3$ gas at a flow rate of 315 L/h, n-butanol at 0.6 L/h and decene at a flow rate of 60 L/h. The polymerization reaction occurred in the microchannel reactor 2, the reaction temperature was 20° C., and the pressure was 5 MPa. The stream obtained after the reaction entered the adsorption device, and the catalyst was removed by adsorption to produce a polyolefin product. After the system run stably, a sample was taken and measured by the gas chromatography for the content of each component in the product. The test results were as shown in Table 11.

TABLE 11

| Olefin composition distribution | Content |
|---|---|
| Monomer, % | 7.4 |
| Dimer, % | 6.9 |
| Trimer, % | 38.1 |
| Tetramer, % | 29.5 |
| Pentamer, % | 15.9 |
| ≥Hexamer, % | 2.2 |
| Conversion, % | 92.6 |

Comparative Example 4

In this example, the structure and the parameter of the mixer and the microchannel reactor 2 were identical to those of Example 1.

In the apparatus, the post-treatment unit 3 was an adsorption device, and its structure and parameter process was as follows: open type, an effective volume of 10 L, operating at normal temperature, feeding at the lower end, discharging at the upper end, and filling the adsorption device with calcium oxide.

The $BF_3$ gas at a flow rate of 315 L/h and n-butanol at 0.6 L/h were mixed in the mixer. The mixed stream and decene at a flow rate of 60 L/h were each independently fed to the microchannel reactor 2. The polymerization reaction occurred in the microchannel reactor 2, the reaction temperature was 20° C., and the pressure was 5 MIPa. The stream obtained after the reaction entered the adsorption device, and the catalyst was removed by adsorption to produce a polyolefin product. After the system run stably, a sample was taken and measured by the gas chromatography for the content of each component in the product. The test results were as shown in Table 12.

TABLE 12

| Olefin composition distribution | Content |
|---|---|
| Monomer, % | 5.5 |
| Dimer, % | 2.8 |
| Trimer, % | 40.5 |
| Tetramer, % | 28.8 |
| Pentamer, % | 18.2 |
| ≥Hexamer, % | 4.2 |
| Conversion, % | 94.5 |

Comparative Example 5

In this example, the structure and parameter of the mixer and the microchannel reactor 2 were identical to those of Example 1.

In the apparatus, the post-treatment unit 3 was an adsorption device, and its structure and parameter process was as follows: open type, an effective volume of 10 L, operating at normal temperature, feeding at the lower end, discharging at the upper end, and filling the adsorption device with calcium oxide.

n-butanol at 0.6 L/h and decene at a flow rate of 60 L/h were mixed in the mixer. The mixed stream at a flow rate of 61.2 L/h and the $BF_3$ gas at a flow rate of 315 L/h were each independently fed to the microchannel reactor 2. The polymerization reaction occurred in the microchannel reactor 2, the reaction temperature was 20° C., and the pressure was 5 MPa. The stream obtained after the polymerization reaction entered the adsorption device, and the catalyst was removed by adsorption to produce a polyolefin product. After the system run stably, a sample was taken and measured by the gas chromatography for the content of each component in the product. The test results were as shown in Table 13.

TABLE 13

| Olefin composition distribution | Content |
|---|---|
| Monomer, % | 1.9 |
| Dimer, % | 2.7 |
| Trimer, % | 43.2 |
| Tetramer, % | 32.1 |
| Pentamer, % | 15.6 |
| ≥Hexamer, % | 4.5 |
| Conversion, % | 98.1 |

Comparative Example 6

The polymerization of the olefin raw material was carried out by using the apparatus for preparing polyalpha-olefins shown in FIG. 7.

In the apparatus, the mixer had the same structure and parameter as that of Example 1.

In the apparatus, the tubular reactor included a reaction tube and a hollow cylindrical shell for accommodating a heat exchange medium, and the reaction tube was arranged in the hollow cylindrical shell in form of spiral coil. Baffle plates were arranged in the hollow cylindrical shell at intervals along the circumferential direction, the baffle plates extending along the cross section direction of the reaction tubes, and provided with through holes capable of accommodating the reaction tubes, so that the reaction tubes passed through the baffle plates. The cylindrical shell was provided with a heat exchange medium inlet and a heat exchange medium outlet respectively. In the apparatus, the post-treatment unit was an adsorption device, which had the same structure and process parameter as that of Example 3.

N-butanol at 0.6 L/h and decene at a flow rate of 60 L/h were mixed in the mixer 12. The mixed stream at a flow rate of 61.2 L/h and the $BF_3$ gas at a flow rate of 315 L/h were each independently fed to the microchannel reactor 2. The polymerization reaction occurred in the tubular reactor, the reaction temperature was 20° C., and the pressure was 5 MPa. The stream obtained after the reaction entered the adsorption device, and the catalyst was removed by adsorption to produce a polyolefin product. After the system run stably, a sample was taken and measured by the gas chromatography for the content of each component in the product. The test results were as shown in Table 14.

TABLE 14

| Olefin composition distribution | Content |
|---|---|
| Monomer, % | 22.7 |
| Dimer, % | 6.3 |
| Trimer, % | 25.1 |
| Tetramer, % | 22.2 |
| Pentamer, % | 14.6 |
| ≥Hexamer, % | 9.1 |
| Conversion, % | 77.3 |

Comparative Example 7

In this example, the structure and parameter of the mixer and the microchannel reactor 2 were identical to those of Example 1.

The $BF_3$ gas at a flow rate of 5 L/h and n-butanol at 0.6 L/h were mixed in the mixer, the mixed stream was passed into the microchannel reactor 2, and 1-decene at a flow rate of 30 L/h was passed into the microchannel reactor 2. The polymerization reaction occurred in the microchannel reactor, the reaction temperature was 20° C., and the pressure was 5 MPa. The stream obtained after the polymerization reaction entered the adsorption device, and the catalyst was removed by adsorption to produce a polyolefin product. After the system run stably, a sample was taken and measured by the gas chromatography for the content of each component in the product. The test results were as shown in Table 15.

TABLE 15

| Olefin composition distribution | Content |
|---|---|
| Monomer, % | 33.5 |
| Dimer, % | 12.9 |
| Trimer, % | 25.6 |
| Tetramer, % | 14.7 |
| Pentamer, % | 9.2 |
| ≥Hexamer, % | 4.1 |
| Conversion, % | 66.5 |

The polyolefin products of Example 1-8 and Comparative Example 1-7 were distilled and cut respectively to obtain polyalpha-olefin synthetic oils above 280° C., and the kinematic viscosity at 100° C. and the viscosity index were tested. The test results were shown in Table 16.

TABLE 16

| Performance evaluation | Kinematic viscosity at 100° C., $mm^2/s$ | Viscosity index |
|---|---|---|
| Example 1 | 5.154 | 141 |
| Example 2 | 5.201 | 143 |
| Example 3 | 5.223 | 144 |
| Example 4 | 5.163 | 143 |
| Example 5 | 5.364 | 144 |
| Example 6 | 5.728 | 148 |
| Example 7 | 5.248 | 146 |
| Example 8 | 5.295 | 149 |
| Comparative Example 1 | 4.167 | 134 |
| Comparative Example 2 | 4.124 | 135 |
| Comparative Example 3 | 4.277 | 134 |
| Comparative Example 4 | 4.251 | 136 |
| Comparative Example 5 | 4.769 | 139 |
| Comparative Example 6 | 4.617 | 135 |
| Comparative Example 7 | 4.316 | 129 |

It can be seen from the above examples and comparative examples that by using the specific process for preparing polyalpha-olefin synthetic oil of the present invention, the conversion of the target product could be improved. In addition, by using the preferred microchannel reactor, the process for synthesizing polyalpha-olefin synthetic oil had a high conversion. This is because the reaction channel 010 and the mixing channel 014 are both tubular structures arranged in the same direction, so that the mixed fluid can form a stable plug flow along the first direction, improving the consistency of the residence time of the mixed fluid, and avoiding or reducing the formation of the undesired products. In addition, the reaction channel 10 is provided with a second mixing member 011, and the mixing channel 014 is provided with a fluid distributor 016 and a first mixing member 015, which can further improve the turbulence degree of the mixed fluid, improve the uniformity of mixing, and further avoid or reduce the production of undesired products, and improve the conversion of the target product.

Moreover, it can be seen from the above examples and comparative examples that by using the process for preparing polyalpha-olefin synthetic oil of the present invention, polyalpha-olefin synthetic oil with excellent results of both kinematic viscosity and viscosity index could be obtained. The preferred embodiments of the present invention have been described above in detail with reference to the accompanying drawings, however, the present invention is not limited thereto. Within the scope of the technical concept of the present invention, various simple modifications can be made to the technical solutions of the present invention, including the combinations of various specific technical features in any suitable manner. In order to avoid unnecessary repetition, the various possible combinations will not be described in detail herein. However, these simple modifications and combinations should also be regarded as the disclosed content of the present invention, and all belong to the protection scope of the present invention.

The invention claimed is:

1. An apparatus for preparing polyalpha-olefins, comprising an input unit, a microchannel reactor, and a post-treatment unit that are successively connected, wherein the input unit comprises a mixer and a pipeline for delivering an olefin raw material, an auxiliary feed and a $BF_3$ catalyst to the microchannel reactor, the mixer is configured to mix at least a part of the auxiliary feed and at least a part of the $BF_3$ catalyst, and the pipeline is configured to individually feed at least a part of the $BF_3$ catalyst to a plurality of mixing channels in the microchannel reactor.

2. The apparatus according to claim 1, wherein the input unit comprises a mixer for mixing a part of the $BF_3$ catalyst, a part of the auxiliary feed and a part of the olefin raw material, and pipelines for individually passing each of the residue of the $BF_3$ catalyst, the residue of the auxiliary feed and the residue of the olefin raw material, based on the feedstock type, into the microchannel reactor;

the input unit comprises a mixer for mixing a part of the $BF_3$ catalyst and the whole auxiliary feed, a pipeline for individually passing the residue of the $BF_3$ catalyst into the microchannel reactor, and a pipeline for individually passing the whole olefin raw material into the microchannel reactor;

or the input unit comprises a mixer for mixing a part of the $BF_3$ catalyst and a part of the auxiliary feed, and pipelines for individually passing each of the residue of the $BF_3$ catalyst, the residue of the auxiliary feed and the whole olefin raw material into the microchannel reactor; or the input unit comprises a mixer for mixing a part of the $BF_3$ catalyst, a part of the auxiliary feed and the whole olefin raw material, and pipelines for individually passing each of the residue of the $BF_3$ catalyst, and the residue of auxiliary feed into the microchannel reactor;

or the input unit comprises a mixer for mixing a part of the $BF_3$ catalyst, the whole auxiliary feed and a part of the olefin raw material, and pipelines for individually passing each of the residue of the $BF_3$ catalyst, and the residue of the olefin raw material into the microchannel reactor; or the input unit comprises a mixer for mixing a part of the $BF_3$ catalyst, the whole auxiliary feed and the whole olefin raw material, and a pipeline for individually passing the residue of the $BF_3$ catalyst into the microchannel reactor, the auxiliary feed and the olefin raw material are mixed in the input unit, the input unit comprises a first mixer for mixing any two of the above three feedstocks, and a second mixer for mixing the mixture from the first mixer and the residual one feedstock, wherein the first mixer is communicated with the second mixer, and the second mixer is communicated with the microchannel reactor.

3. The apparatus according to claim 1, wherein the microchannel reactor comprises:

a shell, a feeding zone, a mixing zone, a reaction zone, and a collection zone are successively arranged and in fluid communication along a first direction in the shell, wherein the shell is provided with a feed pipe in fluid communication with the feeding zone and a discharge pipe in fluid communication with the collection zone, and the mixing zone is provided with a plurality of mixing channels extending along the first direction;

wherein a fluid distribution pipe extend from the exterior of the shell into the feeding zone, wherein a plurality of branch pipes are connected to the fluid distribution pipe, each branch pipe having a first end connected to the fluid distribution pipe and a second end extending into one of the plurality of mixing channels, and is connected with a fluid distributor disposed at an end of the mixing channel;

the feed pipe is connected to the input unit for inputting the feedstock from the input unit, and the discharge pipe is connected to the post-treatment unit.

4. The apparatus according to claim 3, wherein the fluid distributor is at least one selected from powder sintered body with micropores, mesoporous foam material, wire mesh, and tube with microslits or micropores, when the fluid distributor is a cylindrical powder sintered body with micropores, the fluid distributor has a cross-sectional area of 0.01 $cm^2$-200 $cm^2$, and a length of 1 mm-2000 mm;

and/or wherein the mixing zone is provided with 2-100 mixing channels, each mixing channel has a cross-sectional area of 0.05 $cm^2$-400 $cm^2$, and a length of 50 mm-5000 mm; and/or each mixing channel comprises a first mixing member, wherein the first mixing member comprises a main flow portion and a branch flow portion that are alternately arranged and communicated along the first direction, the main flow portion is provided with a single main flow passage, and the branch flow portion is provided with a plurality of branch flow passages; and/or a collection cavity in fluid communication with a plurality of branch flow passages is disposed downstream of the branch flow portion; and/or the mixing zone comprises a first heat exchange cavity disposed in the shell, the plurality of mixing channels are disposed in the first heat exchange cavity, the shell is provided with an inlet for a first heat exchange medium and an outlet for the first heat exchange medium outlet that are in fluid communication with the first heat exchange cavity, the volumetric ratio of the first heat exchange cavity to the plurality of mixing channels is 2-50; and/or a transition zone is provided between the mixing zone and the reaction zone, the transition zone comprises a stabilization channel having a constant cross-section and a diffusion channel having a gradually enlarged cross-section arranged and communicated along the first direction, the stabilization channel is in fluid communication with the mixing channel, the diffusion channel is in fluid communication with the reaction zone, the discharge pipe is connected to the stabilization channel; the diffusion channel is provided with a diffusion plate with meshes or slits; and/or the reaction zone is provided with a plurality of reaction channels extending along the first direction and in fluid communication with the mixing channel via the transition zone; and/or each reaction channel is provided with a second mixing member, and the second mixing member comprises a base strip extending along the first direction and a tooth element connected to the base strip and extended transversely to the base strip, the tooth element is of shape that is at least one of triangular, arcual, wavy, and spiral shapes, and the second mixing member has a thickness of 0.1 mm-3 mm, and a spacing between two adjacent tooth elements is 1 mm-50 mm;

each reaction channel is independently provided with a plurality of the second mixing members that are stacked at intervals, and the tooth elements of the second mixing member are staggered with each other; and/or the reaction channel has a cross section of a shape that is at least one of circular, rectangular and triangular; and/or each reaction channel has a cross-sectional area of 1 $mm^2$–150 $mm^2$, and a length of 50 mm-5000 mm, and a minimum distance between two reaction channels is 1 mm-50 mm; and/or the reaction zone is provided with a second heat exchange cavity disposed in the shell, the plurality of reaction channels are disposed in the second heat exchange cavity, the shell is provided with an inlet for a second heat exchange medium and an outlet for the second heat exchange medium that are communicated with the second heat exchange cavity, and a volumetric ratio of the second heat exchange cavity to the plurality of reaction channels is 2-50.

5. The apparatus according to claim 1, wherein the post-treatment unit is one or more selected from the group consisting of adsorption device, extraction device, distilling device, centrifugation device, sedimentation device, alkaline washing device, and water washing device.

6. The apparatus according to claim 1, wherein, based on a total mass of $BF_3$ in the microchannel reactor, a mass ratio of the $BF_3$ catalyst that is directly fed to the microchannel reactor to the $BF_3$ catalyst that is mixed in the input unit is 90-10:10-90.

7. A process for preparing polyalpha-olefins, comprising:

feeding a $BF_3$ catalyst, an auxiliary feed, and an olefin raw material through an input unit into a microchannel reactor, and carrying out a polymerization reaction in the microchannel reactor to produce a polymerization product, and subjecting the polymerization product to post-treatment to produce a polyolefin product, wherein:

the microchannel reactor comprises a plurality of mixing channels, at least a part of the auxiliary feed and at least a part of the $BF_3$ catalyst are mixed in the put unit, and at least a part of the $BF_3$ catalyst is individually fed to the plurality of mixing channels in the microchannel reactor, and a mass ratio of the auxiliary feed, the olefin raw material and the $BF_3$ catalyst in total is 1:1-1000:1-500.

8. The process according to claim 7, wherein:

in the input unit, a stream obtained by mixing a part of the $BF_3$ catalyst and the whole auxiliary feed is passed into the microchannel reactor, and, each of the residue of the $BF_3$ catalyst and the whole olefin raw material is individually passed into the microchannel reactor, and in the case of mixing a part of the $BF_3$ catalyst and the whole auxiliary feed in the mixer, the speed for passing a part of the $BF_3$ catalyst into the mixer is 1-100000 L/h, the speed for passing the whole auxiliary feed into the mixer is 0.01-1000 L/h, the speed for passing the mixture obtained after mixing a part of the $BF_3$ catalyst and the whole auxiliary feed in the mixer into the microchannel reactor is 0.01-2000 L/h, the speed for individually passing the residue of the $BF_3$ catalyst into the microchannel reactor is 1-150000 L/h, the speed for individually passing the whole olefin raw material into the microchannel reactor is 10-5000 L/h; or in the input unit, the stream obtained by mixing a part of the $BF_3$ catalyst and a part of the auxiliary feed is passed into the microchannel reactor, and each of the residue of the $BF_3$ catalyst, the residue of the auxiliary feed, and the whole olefin raw material is individually passed into the microchannel reactor, and in the case of mixing a part of the $BF_3$ catalyst and a part of the auxiliary feed in the mixer, the speed for passing a part of the $BF_3$ catalyst into the mixer is 1-100000 L/h, the speed for passing a part of the auxiliary feed into the mixer is 0.01-800 L/h, the speed for passing the mixture obtained by mixing a part of the $BF_3$ catalyst and a part of the auxiliary feed in the mixer into the microchannel reactor is 0.01-1600 L/h, the speed for individually passing the residue of the $BF_3$ catalyst into the microchannel reactor is 1-120000 L/h, the speed for passing the residue of the auxiliary feed into the mixer is 0.01-200 L/h, the speed for individually passing the whole olefin raw material into the microchannel reactor is 10-5000 L/h in the input unit, the stream obtained by mixing a part of the $BF_3$ catalyst, a part of the auxiliary feed and the whole olefin raw material is passed into the microchannel reactor, and each of the residue of the $BF_3$ catalyst, and the residue of the auxiliary feed is individually passed into the microchannel reactor, and in the case of mixing a part of the $BF_3$ catalyst, a part of the auxiliary feed, and the whole olefin raw material in the mixer, the speed for passing a part of the $BF_3$ catalyst into the mixer is 1-100000 L/h, the speed for passing a part of the auxiliary feed into the mixer is 0.01-800 L/h, the speed for passing the whole olefin raw material into the mixer is 10-5000 L/h, the speed for passing the mixture obtained by mixing a part of the $BF_3$ catalyst, a part of the auxiliary feed, and the whole olefin raw material in the mixer into the microchannel reactor is 0.01-6000 L/h, the speed for individually passing the residue of the $BF_3$ catalyst into the microchannel reactor is 1-150000 L/h, the speed for individually passing the residue of the auxiliary feed into the microchannel reactor is 0.01-200 L/h; or in the input unit, the stream obtained by mixing a part of the $BF_3$ catalyst, the whole auxiliary feed and a part of the olefin raw material is passed into the microchannel reactor, and each of the residue of the $BF_3$ catalyst, and the residue of the olefin raw material is individually passed into the microchannel reactor, and in the case of mixing a part of the $BF_3$ catalyst, the whole auxiliary feed and a part of the olefin raw material in the mixer, the speed for passing a part of the $BF_3$ catalyst into the mixer is 1-100000 L/h, the speed for passing the whole auxiliary feed into the mixer is 0.01-1000 L/h, the speed for passing a part of the olefin raw material into the mixer is 1-2000 L/h, the speed for passing the mixture obtained by mixing a part of the $BF_3$ catalyst, the whole auxiliary feed and a part of the olefin raw material in the mixer into the microchannel reactor is 0.01-3000 L/h, the speed for individually passing the residue of the $BF_3$ catalyst into the microchannel reactor is 1-150000 L/h, the speed for individually passing the residue of the olefin raw material into the microchannel reactor is 9-3000 L/h in the input unit, the stream obtained by mixing a part of the $BF_3$ catalyst, the whole auxiliary feed, and the whole olefin raw material is passed into the microchannel reactor, and, the residue of the $BF_3$ catalyst is individually passed into the microchannel reactor and in the case of mixing a part of the $BF_3$ catalyst, the whole auxiliary feed, and the whole olefin raw material in the mixer, the speed for passing a part of the $BF_3$ catalyst into the mixer is 1-100000 L/h, the speed for passing the whole auxiliary feed into the mixer is 0.01-1000 L/h, the speed for passing the whole olefin raw material into the mixer is 10-5000 L/h, the speed for passing the mixture obtained by mixing a part of the $BF_3$ catalyst, the whole auxiliary feed, and the whole olefin raw material in the mixer into the microchannel reactor is 10-6000 L/h, the speed for individually passing the residue of the $BF_3$ catalyst into the microchannel reactor is 1-150000 L/h.

9. The process according to claim 7, the olefin raw material comprises one or more of $C_3$-$C_{20}$ alpha-olefins, optionally $C_5$-$C_{20}$ alkanes, and optionally $C_1$-$C_{20}$ oxygen-containing compound; and/or the auxiliary feed is one or more selected from the group consisting of an alcohol having a carbon atom number of 1-20, an ether having a carbon atom number of 1-20, an aldehyde having a carbon atom number of 1-20, a ketone having a carbon atom number of 1-20, an ester having a carbon atom number of 1-30, a carboxylic acid having a carbon atom number of 1-20 and a phenol having a carbon atom number of 1-20.

10. The process according to claim 7, wherein the polymerization reaction in the microchannel reactor is carried out at 0-120° C., under a pressure of 0.01-10 MPa, and has a residence time of the olefin raw material of 1-3600 seconds.

11. The process according to claim 7, wherein, based on the total mass of the $BF_3$ in the microchannel reactor, the mass ratio of the $BF_3$ catalyst individually fed to the microchannel reactor to the $BF_3$ catalyst that is mixed in the input unit is 90-10:10-90.

12. The process according to claim 7, wherein the post-treatment comprises one of more treatment selected from the group consisting of adsorption, centrifugation, sedimentation, alkaline washing, water washing, and gas-liquid separation.

13. The process according to claim 7, wherein the poly-alpha-olefins are prepared by in an apparatus, the apparatus comprising an input unit, a microchannel reactor, and a post-treatment unit that are successively connected, wherein the input unit comprises a mixer and a pipeline for delivering an olefin raw material, an auxiliary feed and a $BF_3$ catalyst to the microchannel reactor, and the mixer is configured to mix at least a part of the auxiliary feed and at least a part of the $BF_3$ catalyst, and the pipeline is configured to individually feed at least a part of the $BF_3$ catalyst to a plurality of mixing channels in the microchannel reactor.

14. The apparatus according to claim 4, wherein the mixing zone is provided with 2-10 mixing channels, and the fluid distribution pipe includes a main pipe extending from the exterior of the shell into the feeding zone and branch pipes extending from the feeding zone into each mixing channel with fluid distributors connected to branch pipe ends; and/or the volumetric ratio of the first heat exchange cavity to the plurality of mixing channels is 5-30;

and/or the tooth element is of triangular shape, and on one side of the triangle adjacent to the base strip, one corner is connected to the base strip, and the other corner is 0.01 mm-20 mm away from the base strip; and/or the reaction channel has a cross section of a shape that is at least one of circular, rectangular and triangular shapes, the cross-section of the reaction channel is rectangular, and the tooth elements extend between a set of opposite sides of the rectangle; and/or each reaction channel has a cross-sectional area of 1 $mm^2$-150 $mm^2$, and a length of 100 mm-3000 mm, and a minimum distance between two reaction channels is 3 mm-30 mm; and/or the second mixing member has a thickness of 0.2 mm-2 mm, and the spacing between adjacent tooth elements is 1.5 mm-20 mm; and/or, the volumetric ratio of the second heat exchange cavity to the plurality of reaction channels is 5-30; and/or based on the total mass of $BF_3$ in the microchannel reactor, the mass ratio of the $BF_3$ catalyst that is directly fed to the microchannel reactor to the $BF_3$ catalyst that is mixed in the input unit is 70-50:30-50.

15. The process according to claim 7, wherein the mass ratio of the auxiliary feed, the olefin raw material and the $BF_3$ catalyst in total is 1:10-250:1-100; and/or the olefin raw material is Fischer-Tropsch olefin raw material; and/or the polymerization reaction in the microchannel reactor is carried out at 20-60° C.; under a pressure of 0.1-6 MPa and has a residence time of the olefin raw material of 15-1000 seconds; and/or based on the total mass of the $BF_3$ in the microchannel reactor, the mass ratio of the $BF_3$ catalyst individually fed to the microchannel reactor to the $BF_3$ catalyst that is mixed in the input unit is 70-50:30-50.

16. The process according to claim 7, wherein:

in the input unit, a stream obtained by mixing a part of the $BF_3$ catalyst and the whole auxiliary feed is passed into the microchannel reactor, and, each of the residue of the $BF_3$ catalyst and the whole olefin raw material is individually passed into the microchannel reactor, and in the case of mixing a part of the $BF_3$ catalyst and the whole auxiliary feed in the mixer, the speed for passing a part of the $BF_3$ catalyst into the mixer is 1-30000 L/h, the speed for passing the whole auxiliary feed into the mixer is 0.2-500 L/h, the speed for passing the mixture obtained after mixing a part of the $BF_3$ catalyst and the whole auxiliary feed in the mixer into the microchannel reactor is 0.2-1000 L/h, the speed for individually passing the residue of the $BF_3$ catalyst into the microchannel reactor is 10-50000 L/h, the speed for individually passing the whole olefin raw material into the microchannel reactor is 40-2500 L/h; or in the input unit, the stream obtained by mixing a part of the $BF_3$ catalyst and a part of the auxiliary feed is passed into the microchannel reactor, and each of the residue of the $BF_3$ catalyst, the residue of the auxiliary feed, and the whole olefin raw material is individually passed into the microchannel reactor, and in the case of mixing a part of the $BF_3$ catalyst and a part of the auxiliary feed in the mixer, the speed for passing a part of the $BF_3$ catalyst into the mixer is 1-30000 L/h, the speed for passing a part of the auxiliary feed into the mixer is 0.2-400 L/h, the speed for passing the mixture obtained by mixing a part of the $BF_3$ catalyst and a part of the auxiliary feed in the mixer into the microchannel reactor is 0.2-800 L/h, the speed for individually passing the residue of the $BF_3$ catalyst into the microchannel reactor is 10-40000 L/h, the speed for passing the residue of the auxiliary feed into the mixer is 0.2-100 L/h, the speed for individually passing the whole olefin raw material into the microchannel reactor is 40-2500 L/h; or in the input unit, the stream obtained by mixing a part of the $BF_3$ catalyst, a part of the auxiliary feed and the whole olefin raw material is passed into the microchannel reactor, and each of the residue of the $BF_3$ catalyst, and the residue of the auxiliary feed is individually passed into the microchannel reactor, and in the case of mixing a part of the $BF_3$ catalyst, a part of the auxiliary feed, and the whole olefin raw material in the mixer, the speed for passing a part of the $BF_3$ catalyst into the mixer is 1-30000 L/h, the speed for passing a part of the auxiliary feed into the mixer is 0.2-400 L/h, the speed for passing the whole olefin raw material into the mixer is 40-2500 L/h, the speed for passing the mixture obtained by mixing a part of the $BF_3$ catalyst, a part of the auxiliary feed, and the whole olefin raw material in the mixer into the microchannel reactor is 0.2-3000 L/h, the speed for individually passing the residue of the $BF_3$ catalyst into the microchannel reactor is 10-50000 L/h, the speed for individually passing the residue of the auxiliary feed into the microchannel reactor is 0.2-100 L/h; or in the input unit, the stream obtained by mixing a part of the $BF_3$ catalyst, the whole auxiliary feed and a part of the olefin raw material is passed into the microchannel reactor, and each of the residue of the $BF_3$ catalyst, and the residue of the olefin raw material is individually passed into the microchannel reactor, and in the case of mixing a part of the $BF_3$ catalyst, the whole auxiliary feed and a part of the olefin raw material in the mixer, the speed for passing a part of the $BF_3$ catalyst into the mixer is 1-30000 L/h, the speed for passing the whole auxiliary feed into the mixer is 0.2-500 L/h, the speed for passing a part of the olefin raw material into the mixer is 10-500 L/h, the speed for passing the mixture obtained by mixing a part of the $BF_3$ catalyst, the whole auxiliary feed and a part of the olefin raw material in the mixer into the microchannel reactor is 0.2-1000 L/h, the speed for individually passing the residue of the $BF_3$ catalyst into the microchannel reactor is 10-50000 L/h, the speed for individually passing the residue of the olefin raw material into the microchannel reactor is 30-2000 L/h; or in the input unit, the stream obtained by mixing a part of the $BF_3$ catalyst, the whole auxiliary feed, and the whole olefin raw material is passed into the microchannel reactor, and, the residue of the $BF_3$ catalyst is individually passed into the microchannel reactor, and in the case of mixing a part of the $BF_3$ catalyst, the whole auxiliary feed, and the whole olefin raw material in the mixer, the speed for passing a part of the $BF_3$ catalyst into the mixer is 1-30000 L/h, the speed for passing the whole auxiliary feed into the mixer is 0.2-500 L/h, the speed for passing the whole olefin raw material into the mixer is 40-2500 L/h, the speed for passing the mixture obtained by mixing a part of the $BF_3$ catalyst, the whole auxiliary feed, and the whole olefin raw material in the mixer into the microchannel reactor is 0.2-3000 L/h, the speed for individually passing the residue of the $BF_3$ catalyst into the microchannel reactor is 10-50000 L/h.

17. The process according to claim 7, wherein, in the input unit, a part of the $BF_3$ catalyst and the whole auxiliary feed are subjected to a first mixing in the first mixer, then subjected to a second mixing with the whole olefin raw material in a second mixer, and then the mixed stream is passed into the microchannel reactor, the residue of the $BF_3$ catalyst is individually passed into the microchannel reactor, when a part of the $BF_3$ catalyst and the whole auxiliary feed are subjected to the first mixing in the first mixer, the speed for passing a part of the $BF_3$ catalyst into the first mixer is 1-100000 L/h, the speed for passing the whole auxiliary feed into the first mixer is 0.01-1000 L/h, the stream obtained after the first mixing is then subjected to a second mixing with the whole olefin raw material in the second mixer, and the speed for passing the stream obtained after the first mixing into the second mixer is 0.01-2000 L/h, the speed for passing the whole olefin raw material into the second mixer is 10-5000 L/h, the speed for passing the stream obtained after the second mixing into the microchannel reactor is 10-7000 L/h, and the speed for individually passing the residue of the $BF_3$ catalyst into the microchannel reactor is 1-150000 L/h.

18. The process according to claim 7, wherein, in the input unit, a part of the $BF_3$ catalyst and the whole auxiliary feed are subjected to a first mixing in the first mixer, then subjected to a second mixing with the whole olefin raw material in a second mixer, the mixed stream is passed into the microchannel reactor, the residue of the $BF_3$ catalyst is individually passed into the microchannel reactor, when a part of the $BF_3$ catalyst and the whole auxiliary feed are subjected to the first mixing in the first mixer, the speed for passing a part of the $BF_3$ catalyst into the first mixer is 1-30000 L/h and the speed for passing the whole auxiliary feed into the first mixer is 0.2-500 L/h, the stream obtained after the first mixing is then subjected to a second mixing with the whole olefin raw material in the second mixer, and the speed for passing the stream obtained after the first mixing into the second mixer is 0.2-1000 L/h, the speed for passing the whole olefin raw material into the second mixer is 40-2500 L/h, the speed for passing the stream obtained after the second mixing into the microchannel reactor is 40-3500 L/h, and the speed for individually passing the residue of the $BF_3$ catalyst into the microchannel reactor is 10-50000 L/h.

* * * * *